(12) United States Patent
Koh

(10) Patent No.: US 7,136,484 B1
(45) Date of Patent: Nov. 14, 2006

(54) CRYPTOSYSTEMS USING COMMUTING PAIRS IN A MONOID

(75) Inventor: Jee H. Koh, Greenwood, IN (US)

(73) Assignee: Silicon Image, Inc., Sunnyvale, CA (US)

( * ) Notice: Subject to any disclaimer, the term of this patent is extended or adjusted under 35 U.S.C. 154(b) by 669 days.

(21) Appl. No.: 10/133,813

(22) Filed: Apr. 24, 2002

Related U.S. Application Data

(60) Provisional application No. 60/326,696, filed on Oct. 1, 2001.

(51) Int. Cl.
*H04L 9/28* (2006.01)

(52) U.S. Cl. .......................................... 380/28; 380/30
(58) Field of Classification Search ................... 380/28
See application file for complete search history.

(56) References Cited

U.S. PATENT DOCUMENTS

| | | | | |
|---|---|---|---|---|
| 4,078,152 A | * | 3/1978 | Tuckerman, III | 380/37 |
| 4,195,200 A | * | 3/1980 | Feistel | 380/37 |
| 4,200,770 A | | 4/1980 | Hellman et al. | |
| 4,218,582 A | * | 8/1980 | Hellman et al. | 380/30 |
| 4,405,829 A | * | 9/1983 | Rivest et al. | 380/30 |
| 4,723,284 A | * | 2/1988 | Munck et al. | 713/159 |
| 5,020,105 A | * | 5/1991 | Rosen et al. | 705/66 |
| 5,241,599 A | * | 8/1993 | Bellovin et al. | 713/171 |
| 5,289,397 A | * | 2/1994 | Clark et al. | 708/491 |
| 5,396,558 A | * | 3/1995 | Ishiguro et al. | 705/67 |
| 5,479,513 A | * | 12/1995 | Protopopescu et al. | 380/28 |
| 5,627,893 A | * | 5/1997 | Demytko | 380/30 |
| 5,633,929 A | * | 5/1997 | Kaliski, Jr. | 380/286 |
| 5,751,811 A | * | 5/1998 | Magnotti et al. | 380/28 |
| 5,787,178 A | * | 7/1998 | Schwenk | 380/30 |
| 5,812,072 A | * | 9/1998 | Masters | 341/55 |
| 5,889,865 A | * | 3/1999 | Vanstone et al. | 713/171 |
| 5,966,444 A | * | 10/1999 | Yuan et al. | 380/283 |
| 6,081,597 A | * | 6/2000 | Hoffstein et al. | 380/28 |
| 6,108,783 A | * | 8/2000 | Krawczyk et al. | 713/180 |
| 6,111,952 A | * | 8/2000 | Patarin | 380/45 |
| 6,243,466 B1 | * | 6/2001 | Young et al. | 380/28 |
| 6,286,101 B1 | * | 9/2001 | Suzuki | 726/34 |

(Continued)

FOREIGN PATENT DOCUMENTS

WO    WO 9944324 A2 * 9/1999

OTHER PUBLICATIONS

Ko et al., New Public-Key Cryptosystem Using Braid Groups, 2000, Proceedings of the 20th Annual International Cryptology Conference on Advances in Cryptology, Lecture Notes In Computer Science; vol. 1880, pp. 166-183.*

(Continued)

*Primary Examiner*—Nasser Moazzami
*Assistant Examiner*—David Garcia Cervetti
(74) *Attorney, Agent, or Firm*—Girard & Equitz LLP

(57) ABSTRACT

Apparati, methods, and computer readable media for enabling two parties (1,2) to exchange encrypted messages, exchange symmetric cryptographic keys, and perform functions of public key cryptography. First and second key exchange algorithms use commuting pairs of subsets of a monoid. The first key exchange algorithm has four principal embodiments. In three of the embodiments, a set of matrices over a hyperbolic ring is used as the monoid. In the fourth embodiment, a braid group is used as the monoid. The second key exchange algorithm has five principal embodiments. In four of the embodiments, a set of matrices over a hyperbolic ring is used as the monoid. In the fifth embodiment, a braid group is used as the monoid.

26 Claims, 12 Drawing Sheets

U.S. PATENT DOCUMENTS

| | | | | |
|---|---|---|---|---|
| 6,298,137 | B1* | 10/2001 | Hoffstein et al. | 380/30 |
| 6,385,725 | B1* | 5/2002 | Baum-Waidner | 713/175 |
| 6,415,032 | B1* | 7/2002 | Doland | 380/255 |
| 6,430,588 | B1* | 8/2002 | Kobayashi et al. | 708/492 |
| 6,446,205 | B1* | 9/2002 | Lenstra | 713/168 |
| 6,493,449 | B1* | 12/2002 | Anshel et al. | 380/30 |
| 6,651,167 | B1* | 11/2003 | Terao et al. | 713/168 |
| 6,666,381 | B1* | 12/2003 | Kaminaga et al. | 235/492 |
| 6,782,100 | B1* | 8/2004 | Vanstone et al. | 380/28 |
| 6,986,054 | B1* | 1/2006 | Kaminaga et al. | 713/193 |
| 2001/0010077 | A1* | 7/2001 | McGregor et al. | 713/174 |
| 2001/0037457 | A1* | 11/2001 | Inada | 713/189 |
| 2002/0027986 | A1* | 3/2002 | Brekne | 380/28 |
| 2003/0223579 | A1* | 12/2003 | Kanter et al. | 380/28 |
| 2005/0157871 | A1* | 7/2005 | Komano et al. | 380/28 |
| 2005/0175173 | A1* | 8/2005 | Nakamura et al. | 380/28 |
| 2005/0175174 | A1* | 8/2005 | Kahl | 380/28 |

OTHER PUBLICATIONS

Anshel et al., An Algebraic Method for Public-Key Cryptography, 1999, Mathematical Research Letters.*

Menezes et al., Handbook of Applied Cryptography, 1996, CRC Press, chaper 12.*

Neal R Wagner, Searching for Public-Key Cryptosystems, 1984, IEEE Symposium on Security and Privacy.*

Neal Wagner, A Public-Key Cryptosystem Based on the World Problem, 1985, Crypto 84, pp. 19-36.*

Computer Letter, Oct. 15, 2001, pp. 1-4, vol. 17, No. 34, published by Technologic Partners, U.S.A.

Jeffrey Hoffstein, Jill Pipher, Joseph H. Silverman; "The NTRU Signature Scheme: Theory and Practice";[online], [retrieved on Oct. 25, 2001]. Retrieved from the Internet <URL: http://ntru.com/technology/tech.technical.htm.

Jeffrey Hoffstein, Jill Pipher, Joseph H. Silverman; "NTRU: A Ring Based Public Key Cryptosystem" [online], [retrieved on Oct. 25, 2001]. Retrieved from the Internet <URL: http://ntru.com/technology/tech.technical.htm.

NTRU Technical center, [online], [retrieved on Oct. 25, 2001]. Retrieved from the Internet <URL: http://ntru.com/technology/tech.technical.htm, 3 pages.

* cited by examiner

CRYPTOSYSTEMS USING COMMUTING PAIRS IN A MONOID

RELATED APPLICATION

This application claims priority upon commonly owned U.S. provisional patent application Ser. No. 60/326,696 filed Oct. 1, 2001 entitled "Cryptosystem," which provisional patent application is hereby incorporated by reference in its entirety into the present patent application.

TECHNICAL FIELD

This invention pertains to the field of cryptography, i.e., techniques by which parties use numerical keys and mathematical algorithms to communicate securely with each other, including over open networks such as the Internet.

BACKGROUND ART

Diffie-Hellman key exchange, as described in U.S. Pat. No. 4,200,770, is a well known example of how two parties can exchange a cryptographic key. Diffie-Hellman key exchange is itself not a public key cryptosystem. Embodiments of the present invention, on the other hand, are public key cryptosystems. In a public key cryptosystem, two parties wishing to communicate securely, e.g., over an open network such as the Internet, each have a private key, known only to the party, and a mathematically related public key that is made publicly available. It is computationally infeasible to derive the private key from the public key. A first party wishing to communicate securely with a second party encrypts plaintext with the public key of the second party and sends the resulting ciphertext to the second party. The second party then decrypts the ciphertext with the second party's private key to retrieve the plaintext. Public key cryptography can also be used for authentication of digital documents, including over open networks.

One drawback of public key cryptography is that it is relatively slow compared with symmetric key cryptography, in which the same key is used for encryption and decryption. Therefore, public key cryptography is often used, not to encrypt the entire plaintext, but to exchange between the parties a symmetric key. The symmetric key is then used to encrypt the plaintext and decrypt the resulting ciphertext.

The Diffie-Hellman method is based on the apparent difficulty in computing logarithms over a finite field GF(q) having a prime number q of elements. For two communicating parties i and j, the Diffie-Hellman method uses a key $K=a^{XiXj}$ mod q, where "mod" denotes a modulo operation. Modulo is similar to the operation of obtaining a remainder in an arithmetic division. In the Diffie-Hellman method, a party i publishes in a public location the value $Y_i=a^{Xi}$ mod q, where Xi is a private undisclosed positive integer. To communicate with a party j, party i obtains a key $K_{ij}$ by computing $K_{ij}=(Y_j)^{Xi}$ mod q. Similarly, party j obtains the key $K_{ij}$ by computing $K_{ij}=(Y_i)^{Xj}$ mod q.

The Diffie-Hellman method has been widely used for the last 25 years, but the existence of a subexponential algorithm (called the index calculus), which can attack Diffie-Hellman, forces Diffie-Hellman users to employ longer key sizes in order to stay secure against increasing computing powers. Hence, it is desirable to have a key exchange algorithm for which an index calculus or similar attack algorithm doesn't exist. The present invention, which uses subsets with certain commuting property, solves this problem.

DISCLOSURE OF INVENTION

In a first embodiment of the present invention (First Key Exchange Algorithm), a first party (represented by device 1) and a second party (represented by device 2) compute a cryptographic key that is used to encrypt and decrypt messages exchanged between the parties (1,2). Said method comprises the steps of:
  the parties select a monoid (G,*), an element g in G, a commuting pair (Y,Z) of subsets of G, and an endomorphism or an antiendomorphism h on G;
  the first party generates a private key q comprising at least one secret integer;
  the first party computes a public key u as a function of g, h, and q;
  the first party sends u to the second party;
  the second party generates a private key w comprising at least one secret integer;
  the second party computes a public key v as a function of g, h, and w;
  the second party sends v to the first party;
  the first party computes $K_A$ as a function of v and q; and
  the second party computes $K_B$ as a function of u and w; whereby
  $K_A=K_B$ as a result of a commuting property associated with the commuting pair, and $K_A=K_B$ is used as a cryptographic key to encrypt and decrypt messages exchanged between the parties.

In a second embodiment of the present invention (Second Key Exchange Algorithm), a first party (represented by device 1) and a second party (represented by device 2) compute a cryptographic key that is used to encrypt and decrypt messages exchanged between the parties (1,2). Said method comprises the steps of:
  the parties select a monoid (G,*), an element g in G, two commuting pairs $(Y_1,Z_1)$ and $(Y_2,Z_2)$ of subsets of G, and an endomorphism or an antiendomorphism h on G;
  the first party generates a private key q comprising at least one secret element;
  the first party computes a public key u as a function of g, h, and q;
  the first party sends u to the second party;
  the second party generates a private key w comprising at least one secret element;
  the second party computes a public key v as a function of g, h, and w;
  the second party sends v to the first party;
  the first party computes $K_A$ as a function of v and q; and
  the second party computes $K_B$ as a function of u and w; whereby
  $K_A=K_B$ as a result of commuting properties associated with the two commuting pairs, and $K_A=K_B$ is used as a cryptographic key to encrypt and decrypt messages exchanged between the parties.

BRIEF DESCRIPTION OF THE DRAWINGS

These and other more detailed and specific objects and features of the present invention are more fully disclosed in the following specification, reference being had to the accompanying drawings, in which.

Figure 1:
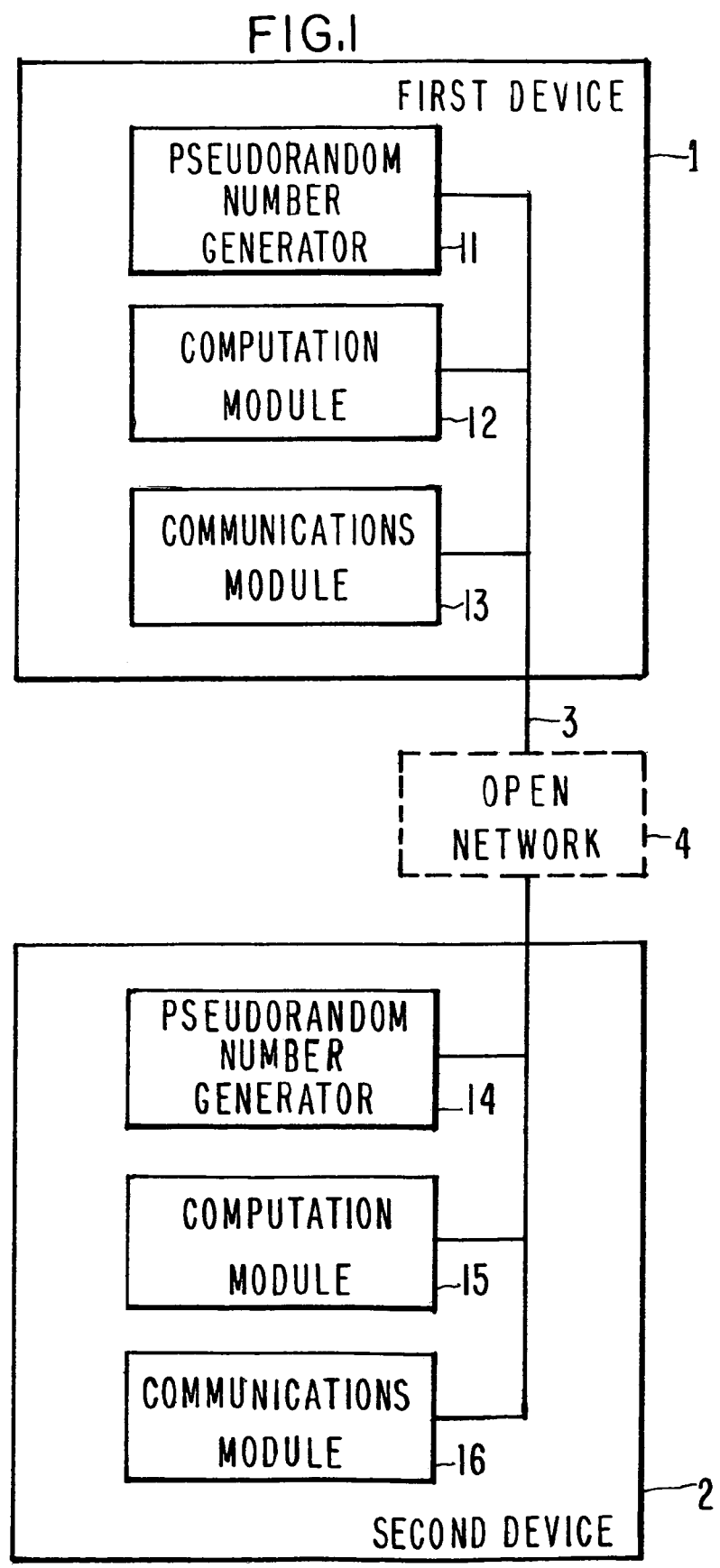
FIG. 1 is a high-level block diagram of a cryptographic system that can implement the present invention.

For simplicity of representation, the binary operator "*" is often omitted in the drawings, and sometimes omitted in the specification, when it represents multiplication.

DETAILED DESCRIPTION OF THE PREFERRED EMBODIMENTS

As illustrated in FIG. 1, first device 1 and second device 2 wish to communicate with each other in a secure fashion over communications link 3. Each of device 1 and device 2 is typically a computer in the broad sense of that term. Device 1 and/or device 2 may be a personal computer, a workstation, a digital telephone, a digital television, a satellite, a set-top box, a personal digital assistant, a laptop computer, etc. Devices 1,2 can be continuously controlled by humans, or can be programmed to operate autonomously or semi-autonomously.

Communications link 3 may be any wired or wireless path, such as a local area network, a wide area network, or a virtual private network. Link 3 may comprise a modulated electromagnetic carrier, a modulated sound or ultrasound wave, or an unmodulated carrier. Link 3 may traverse an open network 4 such as the Internet. Link 3 may be susceptible to hackers, crackers, terrorists, and/or spies who harbor a nefarious intent to intercept, interrupt, spoof, or otherwise disrupt messages carried on link 3. Devices 1 and 2 wish to communicate securely, so that their messages will not be intercepted, interrupted, spoofed, or otherwise disrupted by the hackers, crackers, terrorists, and/or spies.

Within device 1 are at least three intercoupled modules: pseudorandom number generator 11, computation module 12, and communications module 13. Similarly, within device 2 are at least three intercoupled modules: pseudorandom number generator 14, computation module 15, and communications module 16. Modules 11 through 16 may be implemented in hardware, software, firmware, or any combination thereof.

Pseudorandom number generators 11, 14 are capable of generating pseudorandom or random numbers, including integers. Computation modules 12, 15 are capable of performing arithmetic operations, and are preferably optimized to perform these arithmetic operations quickly. Modules 12 and 15 may comprise arithmetic units, memory, and/or shift registers. Communications modules 13 and 16 are adapted to send and receive messages over communications link 3. Modules 13 and 16 may comprise modulators, demodulators, multiplexers, and/or demultiplexers.

FIG. 1 shows a direct link between modules 11 and 13, and a direct link between modules 14 and 16. These two links are optional.

Unencrypted messages are referred to herein as "plaintext", while encrypted messages are referred to as "ciphertext".

A generic way to construct a key exchange algorithm is to use sets of functions with certain commuting property.

Generic Key Exchange Algirithm. Let S be a set. Let $(Y',Z')$ be a pair of sets of functions on S such that $f(g(x))=g(f(x))$ for all f in Y', g in Z', and x in S. For each fixed element x of S, we have the following key exchange algorithm:

1. Alice selects a random function f in Y', and sends to Bob $f(x)$.

2. Bob selects a random function g in Z', and sends to Alice $g(x)$.

3. Alice computes $f(g(x))$, and Bob computes $g(f(x))$. Since $f(g(x))=g(f(x))$, they have computed the same element of S. This same element can be used as a cryptographic key enabling secure communications between Bob and Alice.

Remark. We may extend the above key exchange algorithm to: Let S be a set. Let $Y_1', Y_2', Z_1'$, and $Z_2'$ be sets of functions on S such that $f_2(g_1(x))=g_2(f_1(x))$ for all $f_1$ in $Y_1'$, $f_2$ in $Y_2'$, $g_1$ in $Z_1'$, $g_2$ in $Z_2'$, and x in S. For each fixed element x of S, we have the following key exchange algorithm:

1. Alice selects random functions $f_1$ in $Y_1'$ and $f_2$ in $Y_2'$. She sends to Bob $f_1(x)$.

2. Bob selects random functions $g_1$ in $Z_1'$ and $g_2$ in $Z_2'$. He sends to Alice $g_1(x)$.

3. Alice computes $f_2(g_1(x))$, and Bob computes $g_2(f_1(x))$. Again, these two results are identical, and can be used as a cryptographic key enabling secure communications between Bob and Alice.

Two key exchange algorithms we describe below are special cases of this extended formulation.

Since the practical examples of sets of functions with commuting property arise in sets with algebraic operation(s), we now define the mathematical objects we will use throughout the present specification, including claims.

Definitions.

1. A binary operation * on a set S is a function from SxS to S; it can be thought of as a rule that assigns a third element to each pair of elements of S. It is customary to denote by a*b the third element that is assigned to a pair of elements a and b. A binary operation * is said to be commutative if a*b=b*a for all elements a and b of S. A binary operation is said to be associative if a*(b*c)=(a*b)*c for all elements a, b, and c of S.

2. A set S with a binary operation * is called a semigroup, denoted by (S,*), if * is associative. An element e of a semigroup (S,*) is called an identity if $e*a=a*e$ for all elements a of S. The identity is unique if it exists. The identity is usually denoted by 0 if the operation is called addition and by 1 if the operation is called multiplication. A semigroup with identity is called a monoid.

3. An element a of a monoid (S,*,e) is said to be invertible if there is an element b such that $a*b=b*a=e$. The inverse of an element is unique if it exists. The inverse of a is denoted by $a^{-1}$ in multiplicative notation. A monoid (G,*,e) is called a group if every element of G has the inverse. A group (G,*) is called abelian if * is commutative.

4. A set R with two binary operations + (called addition) and * (called multiplication) is said to be a ring if (R,+,0) is an abelian group, (R,*,1) is a monoid, and * distributes over +, i.e., $a*(b+c)=a*b+a*c$ and $(b+c)*a=b*a+c*a$. A ring is called commutative if * is commutative.

5. A field (F,+,*) is a commutative ring such that (F−{0},*) is a group, i.e., each non-zero element has a multiplicative inverse.

6. A pair (Y,Z) of subsets of a monoid G is called a commuting pair in G if $y*z=z*y$ for all y in Y and z in Z.

7. A function h from a monoid (G,*) to itself is called an endomorphism if $h(1)=1$ and $h(a*b)=h(a)*h(b)$ for all a and b in G. h is called an antiendomorphism if $h(1)=1$ and $h(a*b)=h(b)*h(a)$ for all a and b in G. $h^c$ denotes the composite function of h iterated c times.

We now describe two special cases of the Generic Key Exchange Algorithm on monoids.

First Key Exchange Algorithm. Let (G,*) be a monoid. Let (Y,Z) be a commuting pair of subsets of G such that every element of Y and Z is invertible. Let h be an endomorphism or an antiendomorphism of G such that $h^2(x)=x$ for all x in Y or Z. For each element g of G, we have the following key exchange algorithm:

1. Alice selects a random odd integer c, a random element y in Y, and a random integer n. She sends to Bob $h^c(y*g^n*y^{-1})$ 2. Bob selects a random odd integer d, a random element z in Z, and a random integer s. He sends to Alice $h^d(z*g^s*z^{-1})$ 3. Alice computes $y*h^c((h^d(z*g^s*z^{-1}))^n)*y^{-1}$, and Bob computes $z*h^d((h^c(y*g^n*y^{-1}))^s)*z^{-1}$. These two elements are equal, and thus can be used as a cryptographic key enabling secure communications between Bob and Alice. Alice corresponds to device 1 and Bob corresponds to device 2.

Remarks. 1) In this key exchange, the public parameters are G, Y, Z, h, and g; the private keys are (c,y,n) and (d,z,s); and the public keys are $h^c(y*g^n*y^{-1})$ and $h^d(z*g^s*z^{-1})$.

2) Since c+d is even, $h^{c+d}$ is an endomorphism (even if h is an antiendomorphism), $h^{c+d}(y)=y$, and $h^{d+c}(z)=z$. Since $y*h^c((h^d(z*g^s*z^{-1}))^n)*y^{-1}=y*h^c(h^d(z*g^{sn}*z^{-1}))*y^{-1}=y*h^{c+d}(z)*h^{c+d}(g^{sn})*h^{c+d}(z^{-1})*y^{-1}=y*h^{c+d}(g^{sn})*z^{-1}*y^{-1}$, and $z*h^d((h^c(y*g^n*y^{-1}))^s)*z^{-1}=z*h^d(h^c(y*g^{ns}*y^{-1}))*z^{-1}=z*h^{d+c}(y)*h^{d+c}(g^{ns})*h^{d+c}(y^{-1})*z^{-1}=z*y*h^{d+c}(g^{ns})*y^{-1}*z^{-1}$, Alice and Bob compute the same element of G.

3) We point out that $h^2(w)=w$ may not hold for w outside Y or Z. Also, if h is an endomorphism such that $h(x)=x$ for all x in Y or Z, then c and d in the algorithm can be chosen to be any integers, not necessarily odd.

Figure 2:
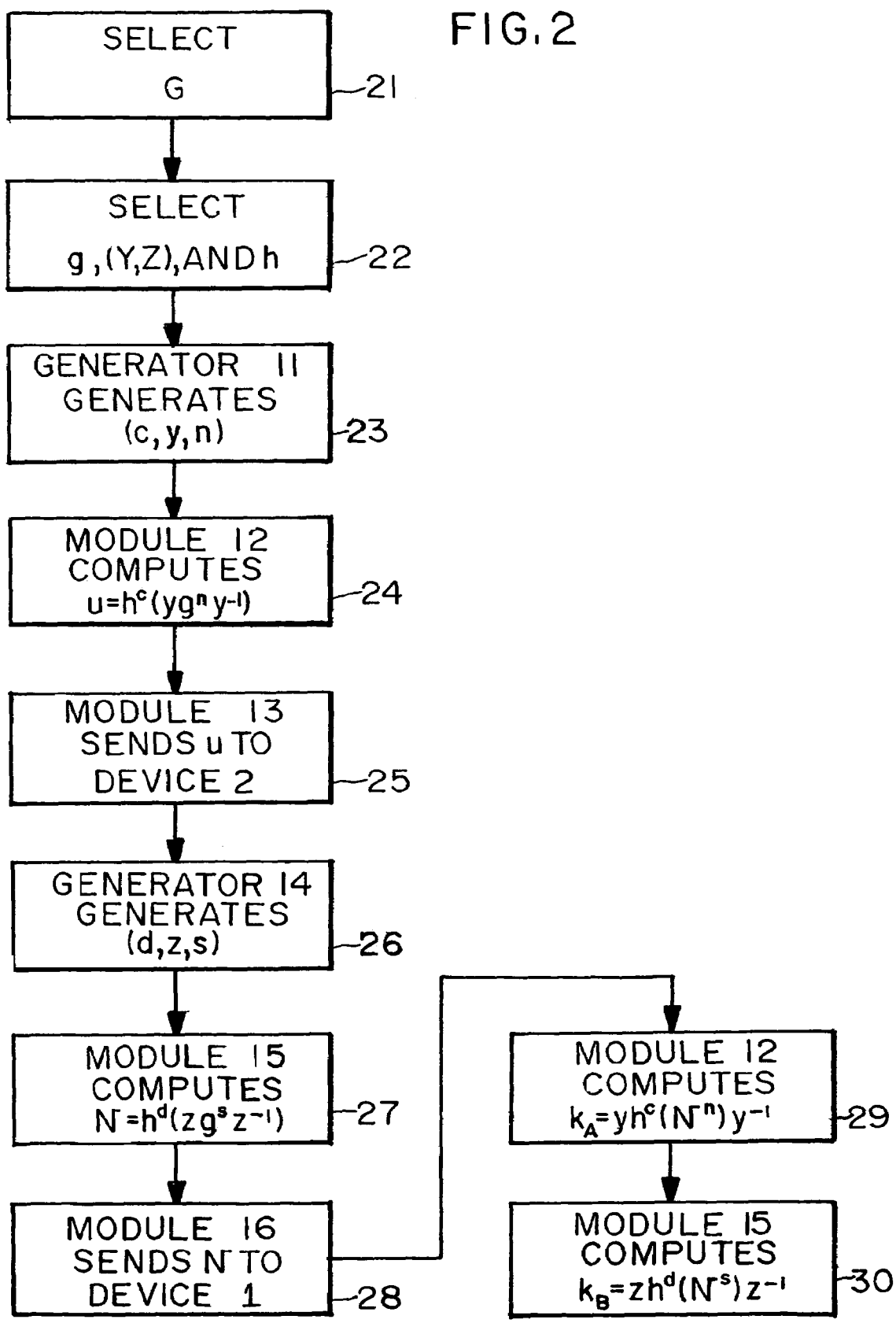
FIG. 2 is a flow diagram of a method for generating keys in a first key exchange algorithm embodiment of the present invention.

According to FIG. 2, and using the communication system of FIG. 1 as an example, devices 1, 2 jointly or severally (i.e., individually) select at step 21 a monoid G. At step 22, devices 1, 2 jointly or severally (i.e., individually) select an element g in G, a commuting pair (Y,Z) of subsets of G, and an endormorphism or an antiendomorphism h that operates on G. The monoid G, the element g, the pair (Y,Z), and h are transmitted to each device 1, 2 if they weren't generated jointly by devices 1, 2.

As used throughout this patent application, devices 1,2 "jointly or severally" selecting a public paramenter means: 1) the public parameter is selected by devices 1 and 2 jointly through communication via public channel 3; or 2) the public parameter is selected individually by device 1 or 2, which communicates the parameter to the other device 2 or 1.

Pseudorandom number generator 11 generates at step 23 a secret triple (c,y,n) consisting of a positive odd integer c, an element y in Y, and a positive integer n. Then, computation module 12 computes at step 24 the element $u=h^c(y*g^n*y^{-1})$ using the secret integers c and n and the element y. At step 25, communications module 13 transmits element u to device 2.

At step 26, pseudorandom number generator 14 generates a secret triple (d,z,s) consisting of a positive odd integer d, an element z in Z, and a positive integer s. At step 27, computation module 15 computes the element $v=h^d(z*g^s*z^{-1})$. At step 28, communications module 16 transmits element v to device 1.

Steps 26–28 can be performed prior to, simultaneously with, or after steps 23–25.

Computation module 12 (at step 29) then determines the value of the cryptographic key $K_A$, based on secret triple (c,y,n) and v. The value of the cryptographic key $K_A$ is equal to $y*h^c(v^n)*y^{-1}$ which is equal to $y*h^c((h^d(z*g^s*z^{-1}))^n)*y^{-1}$. Similarly, computation module 15 (at step 30) determines the value of the cryptographic key $K_B$, based on secret triple (d,z,s) and u. The value of the cryptographic key $K_B$ is equal to $z*h^d(u^s)*z^{-1}$ which is equal to $z*h^d((h^c(y*g^n*y^{-1}))^s)*z^{-1}$.

Since c+d is even, yz=zy, and $y^{-1}z^{-1}=z^{-1}y^{-1}$, the cryptographic key $K_A$ and the cryptographic key $K_B$ are both equal to $y*z*h^{c+d}(g^{sn})*z^{-1}*y^{-1}=z*y*h^{d+c}(g^{ns})*y^{-1}*z^{-1}$. Thus, key agreement is achieved between devices 1 and 2 as desired, and $K_A$ and $K_B$ can be used as symmetric session keys.

Device 1 uses $K_A$ as a key to encrypt plaintext messages that device 1 sends to device 2 and to decrypt ciphertext messages that device 1 receives from device 2. Similarly, device 2 uses $K_B$ as a key to encrypt plaintext messages that device 2 sends to device 1 and to decrypt ciphertext messages that device 2 receives from device 1.

Second Key Exchange Algorithm. Let (G,*) be a monoid. Let $(Y_1,Z_1)$ and $(Y_2, Z_2)$ be two commuting pairs of subsets of G. Let h be an endomorphism or an antiendomorphism of G such that $h^2(x)=x$ for all x in $Y_1, Y_2, Z_1$, or $Z_2$. For each element g of G, we have the following key exchange algorithm:

1. Alice selects an odd integer c and random elements $y_1$ in $Y_1$ and $y_2$ in $Y_2$. She sends to Bob $h^c(y_1*g*y_2)$.

2. Bob selects an odd integer d and random elements $z_1$ in $Z_1$ and $z_2$ in $Z_2$. He sends to Alice $h^d(z_1*g*z_2)$.

3. Alice computes $y_1*h^c(h^d(z_1*g*z_2))*y_2$, and Bob computes $z_1*h^d(h^c(y_1*g*y_2))*z_2$. These two elements in G are identical, and can thus be used as a symmetric cryptographic key enabling Bob and Alice to encrypt and decrypt messages exchanged between them. Again, Alice corresponds to device 1 and Bob corresponds to device 2.

Remarks. 1) In this key exchange, the public parameters are G, $(Y_1,Z_1)$, $(Y_2,Z_2)$, h, and g; the private keys are $(c,y_1,y_2)$ and $(d,z_1,z_2)$; and the public keys are $h^c(y_1*g*y_2)$ and $h^d(z_1*g*z_2)$.

2) Since c+d is even, $h^{c+d}$ is an endomorphism (even if h is an antiendomorphism), $h^{c+d}(z_i)=z_i$, and $h^{c+d}(y_i)=y_i$, for i=1, 2. Since $y_1*h^c(h^d(z_1*g*z_2))*y_2=y_1*z_1*h^{c+d}(g)*z_2*y_2$, $z_1*h^d(h^c(y_1*g*y_2))*z_2=z_1*y_1*h^{d+c}(g)*y_2*z_2$, $y_1*z_1=z_1*y_1$, and $z_2*y_2=y_2*z_2$, Alice and Bob compute the same element of G.

3) If h is an endomorphism such that h(x)=x for all x in $Y_i$ or $Z_i$ for i=1,2, then c and d in the algorithm can be chosen to be any integers, not necessarily odd.

4) This algorithm can be extended to a set S on which a monoid G acts on both sides, i.e., for elements a and b of G and an element s of S, the elements as and sb of S are defined and (as)b=a(bs). If $(Y_1,Z_1)$ and $(Y_2,Z_2)$ are two commuting pairs in G, and if h is a function on S such that h(as)=ah(s) and h(sb)=h(s)b, then for each element s of S, we have the above key exchange algorithm. The same idea can be applied to an R-R-bimodule M over a ring R. If $(Y_1,Z_1)$ and $(Y_2,Z_2)$ are commuting pairs in R and h is a bimodule endomorphism of M, then for each element x of M, we have the above key exchange algorithm.

Figure 3:
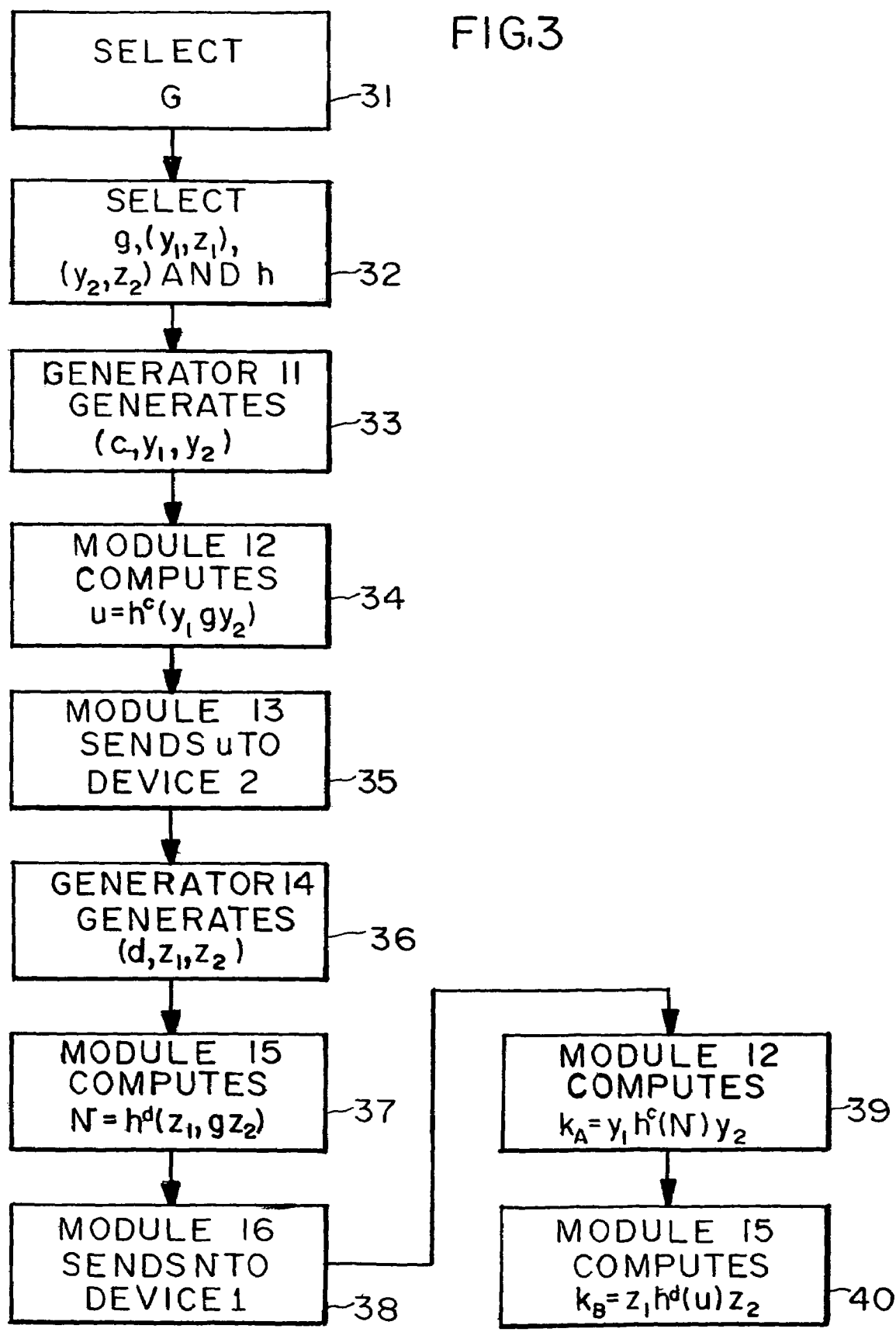
FIG. 3 is a flow diagram of a method for generating keys in a second key exchange algorithm embodiment of the present invention.

According to FIG. 3, and using the communication system of FIG. 1 as an example, devices 1, 2 jointly or severally (i.e., individually) select at step 31 a monoid G. At step 32, devices 1, 2 jointly or severally (i.e., individually) select an element g in G, two commuting pairs $(Y_1,Z_1)$ and $(Y_2,Z_2)$ of subsets of G, and an endomorphism or an antiendomorphism h that operates on G. The monoid G, the element g, the pairs $(Y_1,Z_1)$ and $(Y_2,Z_2)$, and h are transmitted to each device 1, 2 if they weren't generated jointly by devices 1, 2.

Pseudorandom number generator 11 generates at step 33 a secret triple $(c,y_1,y_2)$ consisting of a positive odd integer, an element $y_1$ in $Y_1$, and an element $y_2$ in $Y_2$. Then, computation module 12 computes at step 34 the element $u=h^c(y_1*g*y_2)$ using the secret triple $(c,y_1,y_2)$. At step 35, communications module 13 transmits element u to device 2.

At step 36, pseudorandom number generator 14 generates a secret triple $(d,z_1,z_2)$ consisting of a positive odd integer d, an element $z_1$ in $Z_1$, and an element $z_2$ in $Z_2$. Then, computation module 15 computes at step 37 the element $v=h^d(z_1*g*z_2)$ using the secret triple $(d,z_1,z_2)$. At step 38, communications module 16 transmits element v to device 1.

Steps 36–38 can be performed prior to, simultaneously with, or after steps 33–35.

Computation module 12 (at step 39) then determines the value of the cryptographic key $K_A$, based on secret triple $(c,y_1,y_2)$ and v. The value of the cryptographic key $K_A$ is equal to $y_1*h^c(v)*y_2$, which is equal to $y_1*h^c(h^d(z_1*g*z_2))*y_2$. Similarly, computation module 15 (at step 40) determines the value of the cryptographic key $K_B$, based on secret triple $(d,z_1,z_2)$ and u. The value of the cryptographic key $K_B$ is equal to $z_1*h^d(u)*z_2$, which is equal to $z_1*h^d(h^c(y_1*g*y_2))*z_2$.

Since c+d is even, $y_1z_1=z_1y_1$, and $y_2z_2=z_2y_2$, the cryptographic key $K_A$ is equal to the cryptographic key $K_B$. Thus, key agreement is achieved between devices 1 and 2 as desired, and $K_A$ and $K_B$ can be used as symmetric session keys in the same manner as for the First Key Exchange Algorithm, as described above.

If h is an endomorphism such that h(x)=x for all x in $Y_1$, $Y_2$, $Z_1$, or $Z_2$, then c and d in this second key exchange algorithm can be chosen to be any integers, not necessarily odd.

Device 1 uses $K_A$ as a key to encrypt plaintext messages that device 1 sends to device 2 and to decrypt ciphertext messages that device 1 receives from device 2. Similarly, device 2 uses $K_B$ as a key to encrypt plaintext messages that device 2 sends to device 1 and to decrypt ciphertext messages that device 2 receives from device 1.

We describe now an ElGamal type public key cryptosystem using the above key exchange algorithms.

Public Key Cryptosystem using the First Key Exchange Algorithm. Let the notation be the same as for the First Key Exchange Algorithm described above. Alice selects a secret triple (c,y,n) consisting of integer c, an element y in Y, and integer n. She computes her public key $u=h^c(y*g^n*y^{-1})$, and publishes the element u. We assume that the messages are elements of the monoid G. To send a message M in G to Alice, Bob selects a secret triple (d,z,s) consisting of integer d, an element z in Z, and integer s. He computes the elements $v=h^d(z*g^s*z^{-1})$ and $K_B=z*h^d(u^s)*z^{-1}$, and sends to Alice the pair of elements $(v,K_B M)$. Alice computes $K_A=y*h^c(v^n)*y^{-1}$ and recovers the message $M=K_A^{-1}(K_B M)$ because $K_A=K_B$.

Public Key Cryptosystem using the Second Key Exchange Algorithm. Let the notation be the same as for the Second Key Exchange Algorithm described above. Alice selects a secret triple $(c,y_1,y_2)$ consisting of integer c, an element $y_1$ in $Y_1$, and an element $y_2$ in $Y_2$. She computes her public key $u=h^c(y_1*g*y_2)$, and publishes the element u. We assume that the messages are elements of the monoid G. To send a message M in G to Alice, Bob selects a secret triple $(d,z_1,z_2)$ consisting of integer d, an element $z_1$ in $Z_1$, and an element $z_2$ in $Z_2$. He computes the elements $v=h^d(z_1*g*z_2)$ and $K_B=z_1*h^d(u)*z_2$, and sends to Alice the pair of elements $(v,K_B M)$. Alice computes $K_A=y_1*h^c(v)*y_2$ and recovers $M=K_A^{-1}(K_B M)$ because $K_A=K_B$.

We point out here that one can construct other public key cryptosystems using the key exchange algorithms described above. For example, we can take a public hash function H assigning a 160-bit hash value to each element of the monoid G. Assuming the message M is a 160-bit string, we can encrypt the message $j=M+'H(K_B)$, where $+'$ denotes the XOR of bit strings. Since $K_A=K_B$ and H is a public hash function, Alice can recover the message M by computing $j+'H(K_A)$.

To give examples of monoids that can be used in the present invention, we describe terminologies and notation that will be used in the sequel.

Definitions.

1. (Hyperbolic ring) Let K be a field. Let f be an automorphism of K, i.e., f is a one-to-one and onto function from K to K such that f(a+b)=f(a)+f(b) and f(ab)=f(a)f(b). Let a be an element of K. We denote by K[u,v;f,a] the ring generated by the indeterminates u, v with the relations:

i) ux=f(x)u and $vx=f^{-1}(x)v$ for all x in K, where $f^{-1}$ denotes the inverse function of f.

ii) uv=a iii) $vu=f^{-1}(a)$.

K[u,v;f,a] is called a hyperbolic ring because of the relations in ii) and iii).

2. (Canonical antiautomorphism) Let R=K[u,v;f,a] be a hyperbolic ring where K is a field. A function T on R defined by $T(a)=f^{-1}(a)$, T(u)=v, and T(v)=u is called the canonical antiautomorphism (i.e., antiendomorphism which is one-to-one and onto) of R.

3. (Notation for 2×2 matrix) We denote a 2×2 matrix (i.e., one having two rows and two columns) as [x,y|z,w], meaning (x,y) is the first row and (z,w) is the second row.

4. We extend the canonical antiautomorphism T in 2 above to an antiautomorphism T(2) of the ring $\text{Mat}_2(R)$ of all 2×2 matrices with entries from $R=K[u,v;f,a]$ as follows: $T(2)([x,y|z,w])=[T(x),T(z)|T(y),T(w)]$.

5. (Braid group) Let m be a positive integer. Let $B_m$ denote the group generated by $g_1, \ldots, g_m$ subject to the relations:
   i) $g_ig_j=g_jg_i$ whenever $|i-j|>1$.
   ii) $g_ig_jg_i=g_jg_ig_j$ whenever $|i-j|=1$.

The group defined above is called a braid group.

We now give examples of the present invention.

The first three examples (FIGS. 4, 5, and 6) of the First Key Exchange Algorithm use matrices over a hyperbolic ring. In these examples, a field F with $2^k$ elements is selected. (We can work with any finite field, but we chose this field for ease of computation.) We denote by F(t) the function field of one variable over F, i.e., F(t) consists of all quotients of two polynomials in t with coefficients in F. We select a nonzero element b of F and a positive integer d. Let f be the automorphism of F(t) defined by f(t)=bt and $f(x)=x^{2^{\wedge}d}$ for all x in F. ($2^{\wedge}d$ means $2^d$.) We now select another nonzero element a of F, and form a hyperbolic ring $R=F(t)[u,v;f,a]$. This embodiment uses invertible 2×2 matrices with entries from R as our monoid G.

Figure 4:
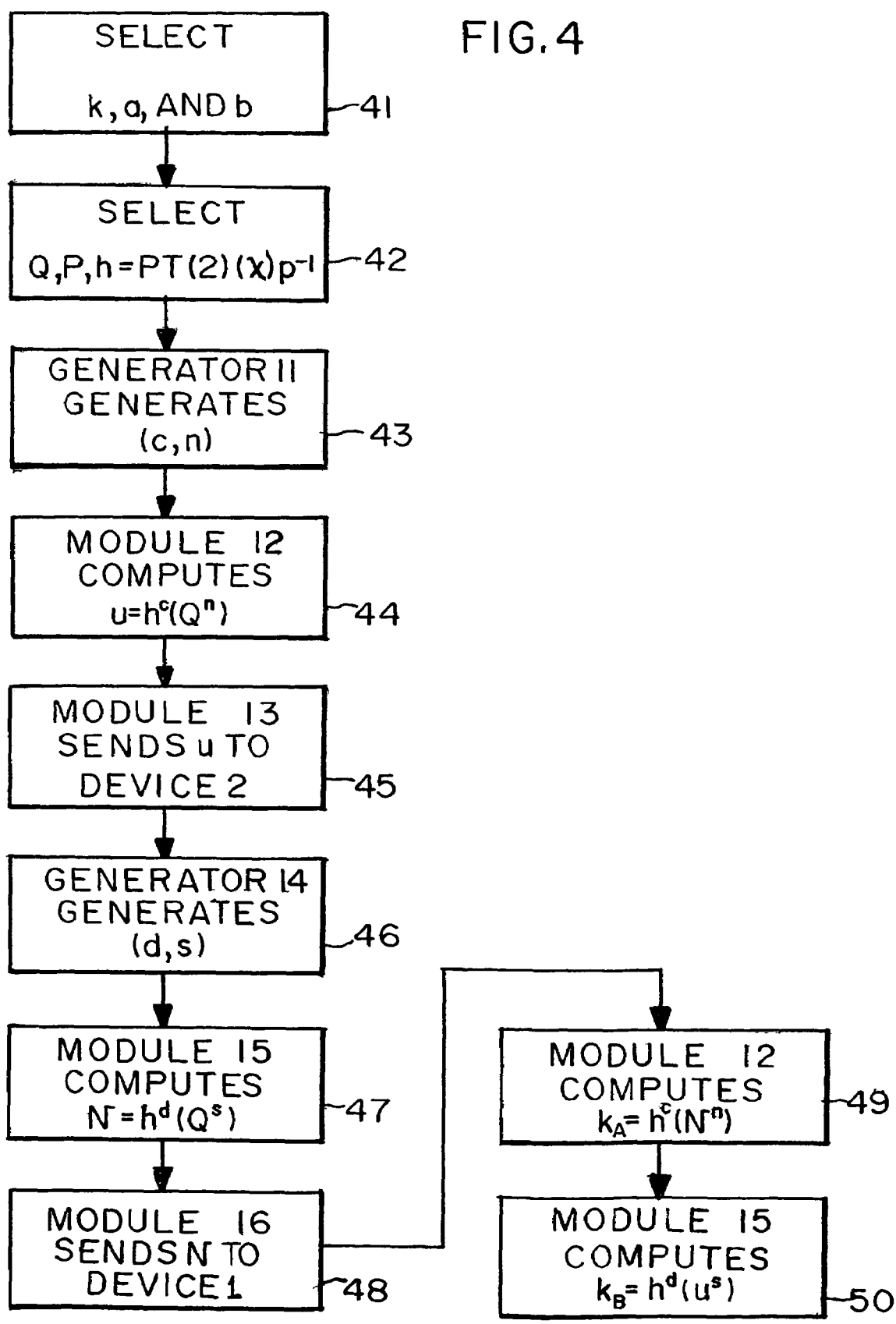
FIG. 4 is a flow diagram of a first embodiment of the first key exchange algorithm, in which matrices over a hyperbolic ring are used.

FIG. 4 is a flow diagram showing the first embodiment of the First Key Exchange Algorithm using matrices over a hyperbolic ring described above. In this embodiment, we take $Y=Z=\{1\}$ so that any endomorphism or antiendomorphism satisfies the condition described in the First Key Exchange Algorithm. We take an invertible matrix P and take our endomorphism h to be the composition of T(2) and the conjugation by P, i.e., $h(x)=PT(2)(x)P^{-1}$. We select an invertible matrix Q for our element g. With these choices, the public keys are $u=h^c(Q^n)$ and $v=h^d(Q^s)$, and the private keys are the pairs of integers (c,n) and (d,s). If we choose P in such a way that $T(2)^2(P)=P$, then $h^c(Q^n)$ can be computed efficiently using a square-and-multiply type technique. If L denotes the subfield of F consisting of elements $f^2(x)=x$, then any matrix P with entries from L[u,v] (i.e., polynomials in u and v with coefficients from L) satisfies the condition $T(2)^2(P)=P$.

At step 41, devices 1,2 jointly or severally select k, a, and b. At step 42, devices 1,2 jointly or severally select Q, P, and h. k, a, b, Q, P, and h are transmitted to each device 1,2 if they weren't generated jointly by devices 1,2.

Pseudorandom number generator 11 generates at step 43 the secret integer pair (c,n). Then computation module 12 computes at step 44 the element u. At step 45, communications module 13 transmits element u to device 2.

At step 46, pseudorandom number generator 14 generates secret integer pair (d,s). At step 47, computation module 15 computes the element v. At step 48, communications module 16 transmits element v to device 1.

Steps 46–48 can be performed prior to, simultaneously with, or after steps 43–45.

Computation module 12, at step 49, then determines the value of the cryptographic key $K_A=h^c(v^n)$. Similarly, computation module 15, at step 50, determines the value of the cryptographic key $K_B=h^d(u^s)$. Key agreement is achieved between devices 1 and 2 as desired, and $K_A=K_B$ can be used as a symmetric session key.

Figure 5:
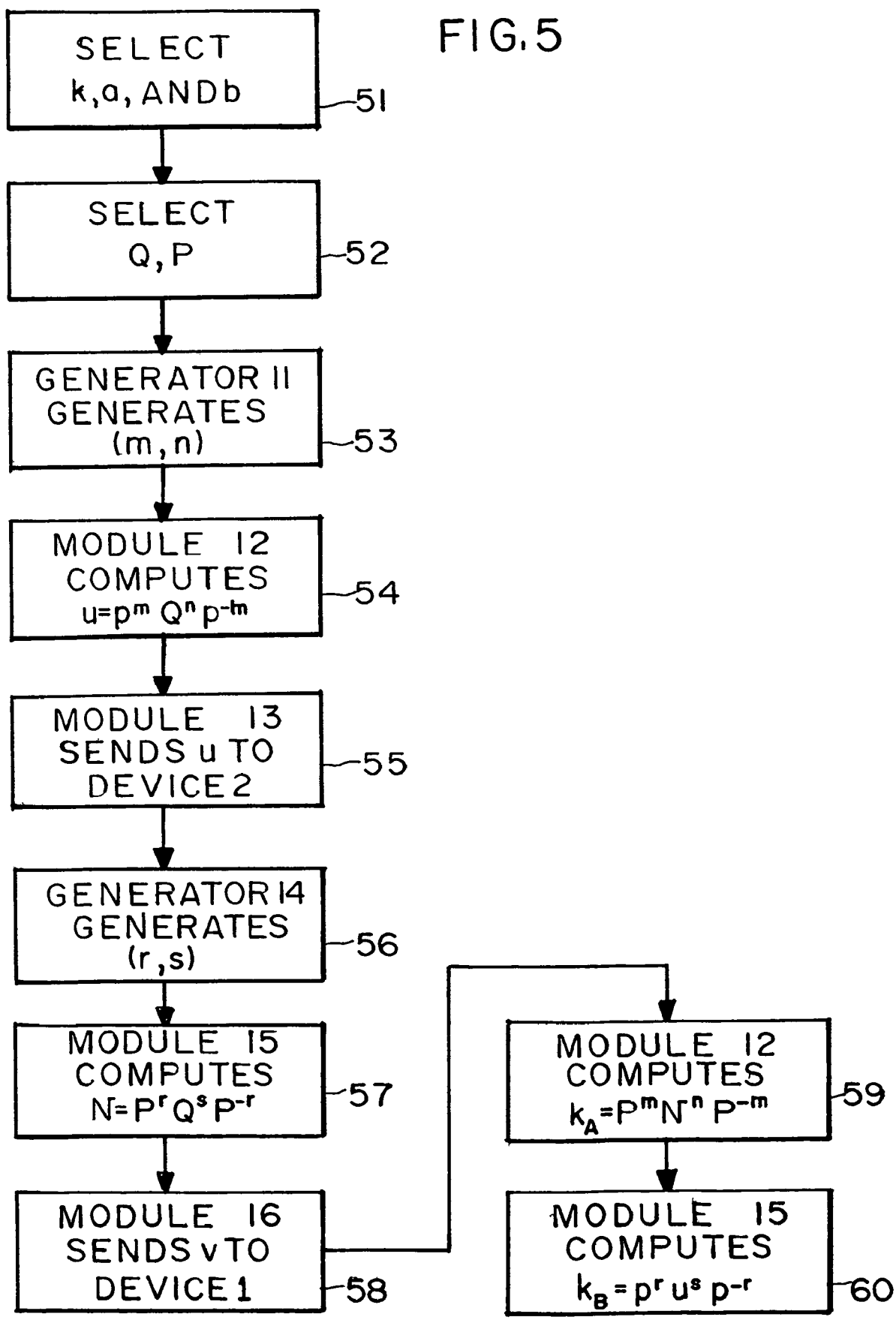
FIG. 5 is a flow diagram of a second embodiment of the first key exchange algorithm, in which matrices over a hyperbolic ring are used.

FIG. 5 is a flow diagram showing the second embodiment of the First Key Exchange Algorithm using matrices over a hyperbolic ring described above. In this embodiment, we again take h=identity so that any commuting pair can be chosen. Select an invertible matrix P, and take $Y=Z=\{P^i: i$ is an integer$\}$. We select an invertible matrix Q for our element g. With these choices, the public keys are $u=P^mQ^nP^{-m}$ and $v=P^rQ^sP^{-r}$, and the private keys are the pairs of integers (m,n) and (r,s). The computation of the public keys can be done efficiently using a square-and-multiply method. In this embodiment, we may also take Y=Z=k[P], where k denotes the center of the ring $\text{Mat}_2(R)$, and k[P] denotes the ring of all polynomials in P with coefficients from k. For example, Alice can choose $(P^m+P^q,n)$ as her private key, and send to Bob her public key $(P^m+P^q)Q^n(P^m+P^q)^{-1}$. We may also choose other commuting pairs, e.g. $Y=Z=\{[x,0|0,x]: x$ in $F(t)\}$, i.e., scalar matrices with diagonal entries from F(t).

At step 51, devices 1,2 jointly or severally select k, a, and b. At step 52, devices 1,2 jointly or severally select Q and P. k, a, b, Q, and P are transmitted to each device 1,2 if they weren't generated jointly by devices 1,2.

At step 53, pseudorandom number generator 11 generates (m,n). Then at step 54, computation module 12 computes u. At step 55, communications module 13 transmits element u to device 2.

At step 56, pseudorandom number generator 14 generates (r,s). At step 57, computation module 15 computes v. At step 58, communications module 16 transmits element v to device 1.

Steps 56–58 can be performed prior to, simultaneously with, or after steps 53–55.

Computation module 12, at step 59, then determines the value of cryptographic key $K_A=P^mv^nP^{-m}$. Similarly, computation module 15, at step 60, determines the value of cryptographic key $K_B=P^ru^sP^{-r}$. Since $K_A$ equals $K_B$, key agreement is achieved between devices 1 and 2 as desired, and $K_A=K_B$ can be used as a symmetric session key.

Figure 6:
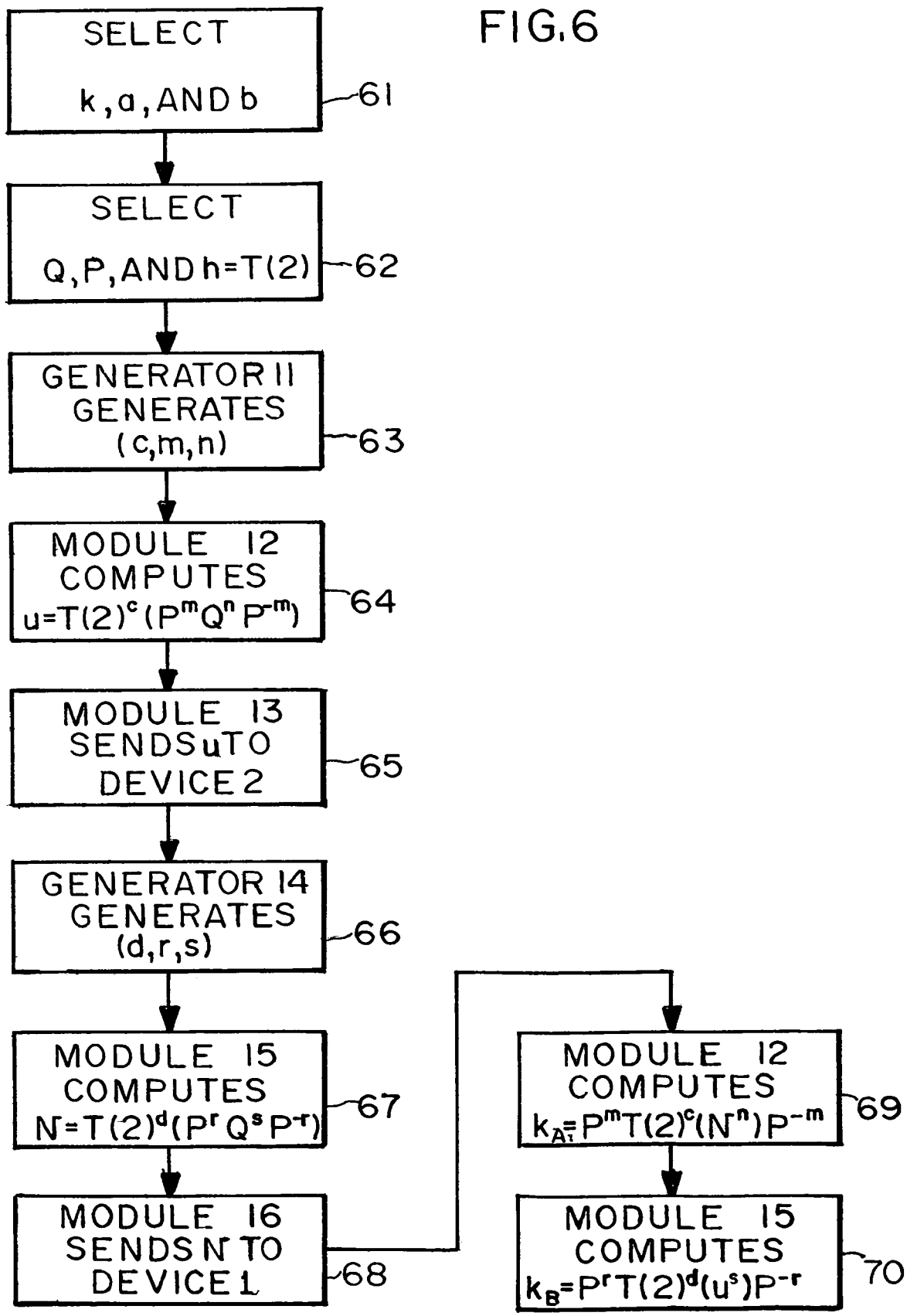
FIG. 6 is a flow diagram of a third embodiment of the first key exchange algorithm, in which matrices over a hyperbolic ring are used.

FIG. 6 is a flow diagram showing the third embodiment of the First Key Exchange Algorithm using matrices over a hyperbolic ring described above. In this embodiment, we take h=T(2) and $Y=Z=\{P^i: i$ is an integer$\}$, where P=[u,0|0,u]. We take any Q for our base element g. With these choices, the public keys are $u=T(2)^c(P^mQ^nP^{-m})$ and $v=T(2)^d(P^rQ^sP^{-r})$, and the private keys are the triples of integers (c,m,n) and (d,r,s). The computation of the public keys can be done efficiently using a square-and-multiply method. In this embodiment, we may take any invertible matrix P with entries from k[u,v], where k denotes the center of the ring R and k[u,v] denotes the ring of all polynomials in two variables u and v with coefficients from k. Our particular choice of P is to make computations simple.

At step 61, devices 1, 2 jointly or severally select k, a, and b. At step 62, devices 1,2 jointly or severally select Q, P, and h. k, a, b, Q, P, and h are transmitted to each device 1,2 if they weren't generated jointly by devices 1,2.

Pseudorandom number generator 11 generates at step 63 secret triple (c,m,n). Then, computation module 12 computes at step 64 the element u. At step 65, communications module 13 transmits element u to device 2.

At step 66, pseudorandom number generator 14 generates secret triple (d,r,s). At step 67, computation module 15 computes the element v. At step 68, communications module 16 transmits element v to device 1.

Steps 66–68 can be performed prior to, simultaneously with, or after steps 63–65.

Computation module 12 at step 69 then determines the value of the cryptographic key $K_A=P^mT(2)^c(v^n)P^{-m}$. Similarly, computation module 15, at step 70, determines the value of cryptographic key $K_B=P^rT(2)^d(u^s)P^{-r}$. Since $K_A$ equals $K_B$, key agreement is achieved between devices 1 and 2 as desired, and $K_A=K_B$ can be used as a symmetric session key.

Remarks on the above three embodiments. 1) The inverse function $(-)^{-1}$ is an antiendomorphism whenever it is defined. Hence, we may use this function if all nonzero entries of the powers of P and Q are invertible. We may also combine this function with T(2).

2) We may choose P and Q of the form [x,ytu|zt$^{-1}$v,w], where x,y,z, and w are in F. Then all powers and products of P and Q are also of the same form. Identifying [x,ytu|zt$^{-1}$v,w] with [x,y|z,w], we may regard this example as 2×2 matrices over a field F with modified multiplication * as follows:

$$[x,y|z,w]*[x',y'|z',w']:=[xx'+y(z')^{2^{-d}}ab^{-1},xy'+y(w')^{2^{e}}|z(x')^{2^{-(k-d)}}+wz',z(y'a)^{2^{-(k-d)}}b^{-1}|ww'].$$

We may take Q of this form to control the key length of the entries of Q$^n$, but we may choose P to be any scalar matrix, e.g. P=[u,0|0,u], because the conjugation by the powers of P doesn't change the key lengths of the entries.

We may work with elements of these types for efficient computation.

3) To improve security of these embodiments, we may select an invertible matrix M, and replace Q with MQM$^{-1}$. We may also take a conjugate of P using a different invertible matrix, or take P of a different form, e.g., P=[tv,0|0,tv] or its conjugates.

As a simple example, we take:
F={0,1,a,a$^2$}, the field with 4 elements where 1+a=a$^2$, 1+a$^2$=a, a+a$^2$=1, a(a$^2$)=1
f(x)=x$^2$, for all x in F, and f(t)=a$^2$t
uv=a, vu=a$^2$, R=F(t)[u,v;f,a]
h=c$_P$ (the conjugation by P), where P=[tu,0|0,tu] (hence P$^{-1}$=[a$^2$t$^{-1}$v,0|0, a$^2$t$^{-1}$v]),
Q=[a,tu|a$^2$t$^{-1}$v,1]

If Alice's private key is (2,3), then her public key P$^2$Q$^3$P$^{-2}$=[0,tu|t$^{-1}$v,1].

We may modify this example using conjugates so that P and Q are more complicated but the number of terms appearing in the entries of the public key P$^m$Q$^n$P$^{-m}$ is relatively small. For example,
 i) If M=[a,1|a,a$^2$], MQM$^{-1}$=[a$^2$tu+a$^2$t$^{-1}$v,a+a$^2$tu+at$^{-1}$v|1+a$^2$tu+at$^{-1}$v,a$^2$+a$^2$tu+t$^{-1}$v] and MPM$^{-1}$=[0,a$^2$tu|a$^2$tu,0].
 ii) If M=[a,a|a,1], MQM$^{-1}$=[tu+t$^{-1}$v,a+tu+a$^2$t$^{-1}$v|1+tu+a$^2$t$^{-1}$v,a$^2$+tu+at$^{-1}$v] and MPM$^{-1}$=[tu,0|tu,atu].
 iii) If M=[1,0|a$^2$,1][u,1|0,v][1,0|a$^2$,1]=[a$^2$+u,1|a+a$^2$u+av,1+a$^2$u], MQM$^{-1}$ and MPM$^{-1}$ become much more complicated.

We remark that we used the identity function in this example for simplicity, but we can easily include an (anti) endomorphism, e.g. T(2), in this example.

Figure 7:
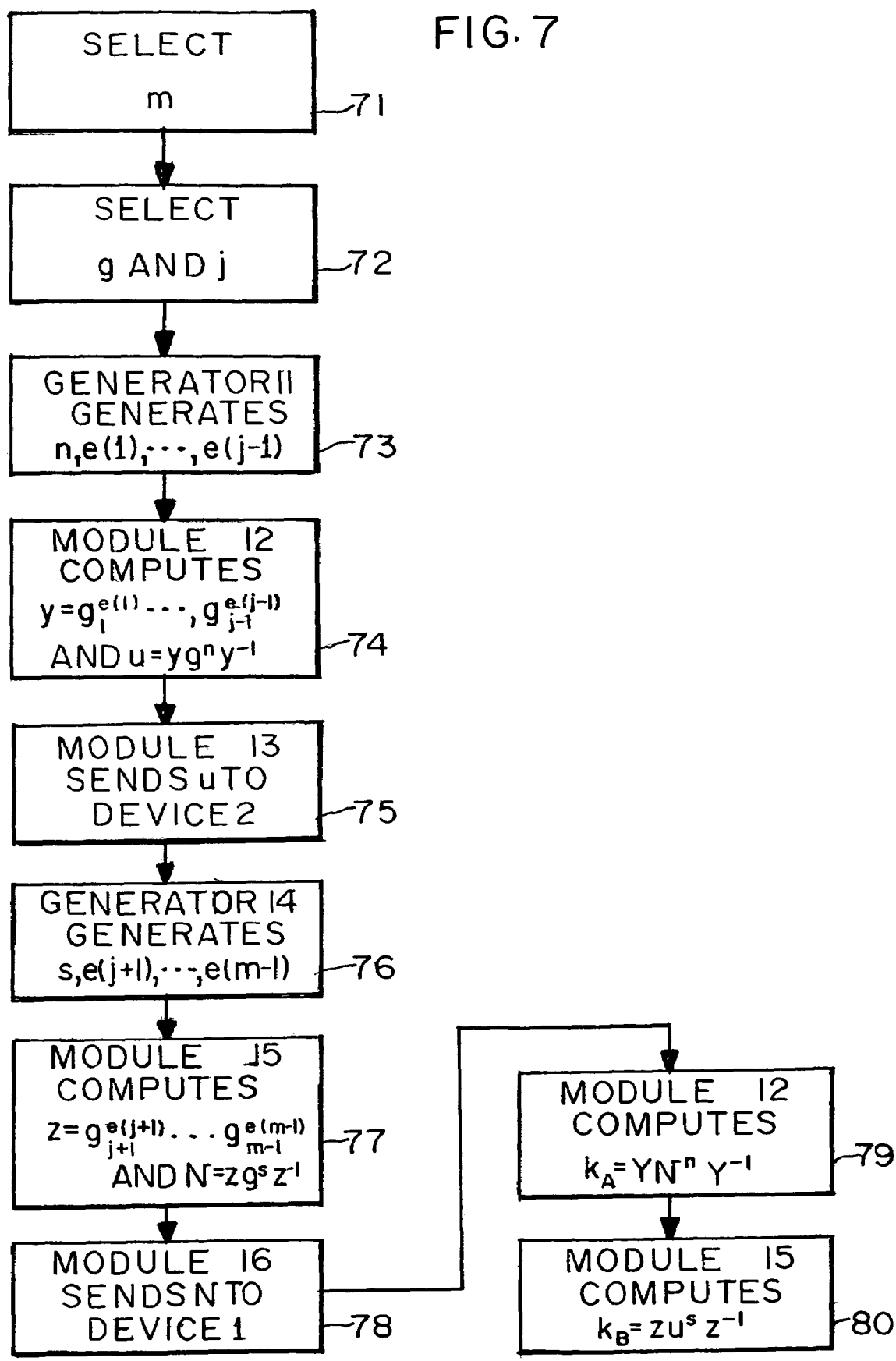
FIG. 7 is a flow diagram of a fourth embodiment of the first key exchange algorithm, in which a b raid group is used.

FIG. 7 is a flow diagram showing a fourth embodiment of the First Key Exchange Algorithm using braid groups. In this embodiment, a positive integer m and another integer 1<j<m−1 are selected. An element g of the braid group B$_m$ is selected, the endomorphism h is chosen to be the identity function, and the commuting pair (Y,Z) is selected as Y= <g$_1$, . . . , g$_{j-1}$>, the subgroup generated by g$_1$, . . . , g$_{j-1}$, and Z=<g$_{j+1}$, . . . , g$_{m-1}$>, the subgroup generated by g$_{j+1}$, . . . , g$_{m-1}$.

One way to generate a private key for Alice is to generate a (j−1)-uple of integers (e(1), . . . , e(j−1)) and select y= g$_1^{e(1)}$ . . . g$_{j-1}^{e(j-1)}$.

In this embodiment, we may also take a single element b of B$_m$, and take Y=Z={b$^i$: i is an integer} so that this embodiment is very similar to the previous one except for using a different monoid.

We chose identity for h merely for the sake of simplicity, but this embodiment works with an (anti)endomorphism.

As a simple example, we take
m=6, h=3 (hence Y=<g$_1$,g$_2$>and Z=<g$_4$,g$_5$>)
g=g$_2$g$_3$g$_5$g$_6$.

If Alice's private key is (2,g$_1^2$g$_2^{-1}$g$_1$g$_2$), her public key is u=(g$_1^2$g$_2^{-1}$g$_1$g$_2$) (g$_2$g$_3$g$_5$g$_6$g$_2$g$_3$g$_5$g$_6$) (g$_2^{-1}$g$_1^{-1}$g$_2$g$_1^{-2}$). (There is a computer program that puts elements in a braid group in standard form.)

At step 71, devices 1,2 jointly or severally select m. At step 72, devices 1,2 jointly or severally select g and j. m, g, and j are transmitted to each device 1,2 if they weren't generated jointly by devices 1,2.

At step 73, pseudorandom number generator 11 generates as a private key integer n and the aforementioned (j−1)-uple of integers. In step 74, computation module 12 computes y and u, where u=yg$^n$y$^{-1}$. At step 75, communications module 13 transmits element u to device 2.

At step 76, pseudorandom number generator 14 generates as a private key integer s and set of integers (e(j+1), . . . , e(m−1)). At step 77, computation module 15 computes z and v, where z=g$_{j+1}^{e(j+1)}$ . . . g$_{m-1}^{e(m-1)}$ and v=zg$^s$z$^{-1}$. At step 78, communications module 16 transmits element v to device 1.

Steps 76–78 can be performed prior to, simultaneously with, or after steps 73–75.

Computation module 12, at step 79, then determines the value of cryptographic key K$_A$=yv$^n$y$^{-1}$. Similarly, computation module 15, at step 80, determines the value of cryptographic key K$_B$=zu$^s$z$^{-1}$. Since K$_A$ equals K$_B$, key agreement is achieved between devices 1 and 2 as desired, and K$_A$=K$_B$ is used as a symmetric session key.

The next four examples use matrices over a hyperbolic ring. In these embodiments, a finite field F with p (prime number) elements is preferably selected. (More generally, we can also work with any finite field.) We denote by F(t) the function field of one variable over F, i.e., F(t) consists of quotients of two polynomials in t with coefficients in F. We select a nonzero element b of F, and denote by f the automorphism of F(t) defined by f(t)=bt and f(x)=x for all x in F. We now select another nonzero element a of F, and form a hyperbolic ring R=F(t)[u,v;f,a].

We describe two sets, U and L, consisting of commuting matrices: Let d be a positive integer. Let e and j be positive integers such that d=e+j. Let [A,B|C,D] denote a dxd matrix in block form, i.e., A is an exe matrix, B is an exj matrix, C is a jxe matrix, and D is a jxj matrix. Let U={[cI$_e$,B,|0,cI$_j$]: c is an element of R such that cB=Bc, and I$_e$ and I$_j$ are identity matrices of sizes exe and jxj, respectively}. Similarly, let L={[cI$_e$,0|C, cI$_j$]: c is an element of R such that cC=Cc, and I$_e$ and I$_j$ are identity matrices of sizes exe and jxj, respectively}. Then it is easy to check that xy=yx for all x and y in U (or in L).

Figure 8:
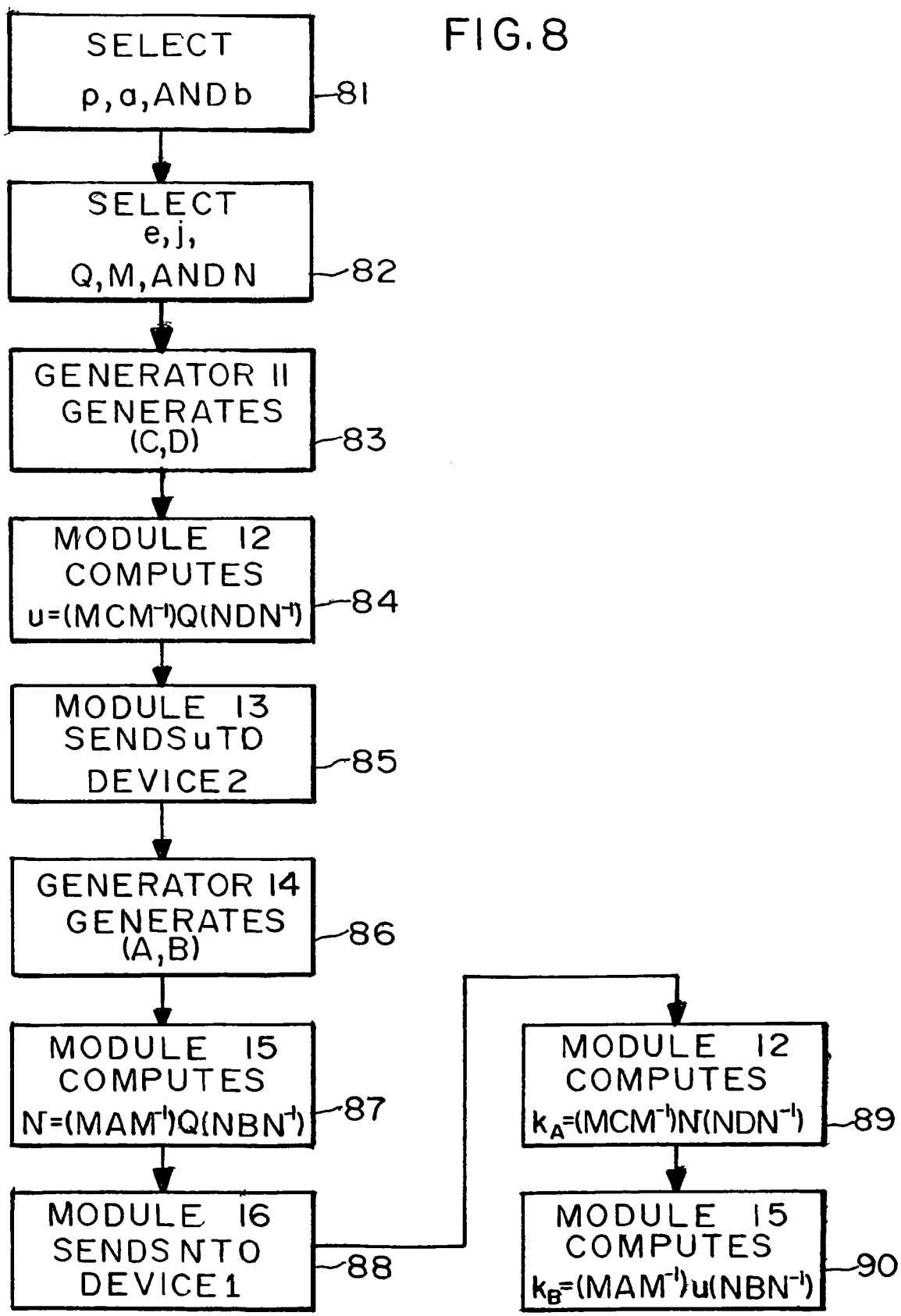
FIG. 8 is a flow diagram of a first embodiment of the second key exchange algorithm, in which matrices over a hyperbolic ring are used.

FIG. 8 is a flow diagram of a first embodiment of the Second Key Exchange Algorithm using matrices over a hyperbolic ring. In this embodiment, d=e+j and our monoid is Mat$_d$(R), the ring of all dxd matrices with entries from R, under matrix multiplication. We take h to be the identity function so that any two commuting pairs can be used. We select two dxd invertible matrices M and N, and take Y$_1$=Z$_1$=MUM$^{-1}$ and Y$_2$=Z$_2$=NLN$^{-1}$. We take any matrix Q for our base element. In this example, Alice's private key is a pair of matrices (C,D), where C is in U and D is in L; Alice's public key is u=(MCM$^{-1}$)Q(NDN$^{-1}$). Similarly Bob's private key is a pair of matrices (A,B), where A is in U and B is in L. Bob's public key is v=(MAM$^{-1}$)Q(NBN$^{-1}$).

At step 81, devices 1,2 jointly or severally select p, a, and b. At step 82, devices 1,2 jointly or severally select Q, M, N, e, and j. p, a, b, e, j, Q, M, and N are transmitted to each device 1,2 if they weren't generated jointly by devices 1,2.

Pseudorandom number generator 11 generates at step 83 (C,D). Then computation module 12 computes at step 84 the element u. At step 85, communications module 13 transmits element u to device 2.

At step 86, pseudorandom number generator 14 generates (A,B). At step 87, computation module 15 computes the element v. At step 88, communications module 16 transmits element v to device 1.

Steps 86–88 can be performed prior to, simultaneously with, or after steps 83–85.

Computation module 12, at step 89, then determines the value of cryptographic key $K_A = (MCM^{-1})v(NDN^{-1})$. Similarly, computation module 15, at step 90, determines the value of cryptographic key $K_B = (MAM^{-1})u(NBN^{-1})$. Since $K_A$ equals $K_B$, key agreement is achieved between devices 1 and 2 as desired, and $K_A = K_B$ is used as a symmetric session key.

For a simple example, we may take d=20, e=h=10, and F=GF(2), the field with 2 elements. Let U(F) denote the set of matrices (in U) all of whose entries are from F. Let $Y_1 = Z_1 = U(F)$ and $Y_2 = Z_2 = L(F)$ (or their conjugates for better security). For any 40×40 matrix Q, we have an example of this key exchange algorithm. The reason for using GF(2) in this example is to control the length of public keys, and minimize the computation time.

Figure 9:
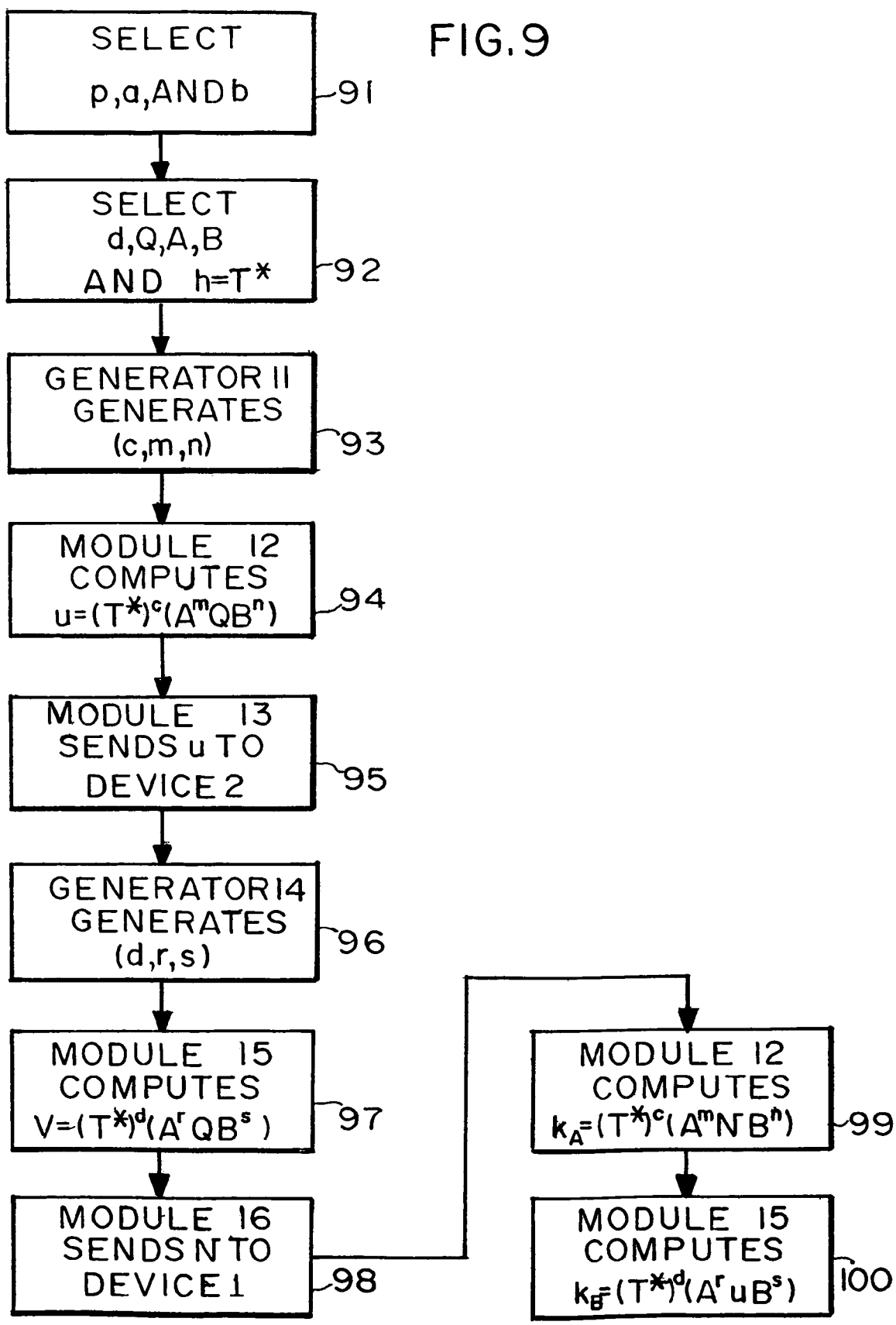
FIG. 9 is a flow diagram of a second embodiment of the second key exchange algorithm, in which matrices over a hyperbolic ring are used.

FIG. 9 is a flow diagram of a second embodiment of the Second Key Exchange Algorithm using matrices over a hyperbolic ring. In this embodiment, our monoid is $Mat_d(R)$ for some selected value of d. We select two dxd matrices A and B, and take $Y_1 = Z_1 = \{A^i: i \text{ is an integer}\}$ and $Y_2 = Z_2 = \{B^i: i \text{ is an integer}\}$. For our endomorphism, we take T*, which is defined by $T^*(x) = (x^{-1})^t$, where $M^t$ denotes the transpose of M. We select any Q for our base element. In this embodiment, Alice's private key is a triple of integers (c,m,n); Alice's public key is $u = (T^*)c(A^m Q B^n)$. Similarly, Bob's private key is integer triple (d,r,s); and Bob's public key is $v = (T^*)^d(A^r Q B^s)$.

We point out that $Y_1 = Z_1$ and/or $Y_2 = Z_2$ may be replaced by other commuting families of matrices.

At step 91, devices 1,2 jointly or severally select p, a, and b. At step 92, devices 1,2 jointly or severally select d, Q, A, B, and h. p, a, b, d, Q, A, B, and h are transmitted to each device 1,2 of they weren't generated jointly by devices 1,2.

Pseudorandom number generator 11 generates at step 93 secret triple (c,m,n). Then, computation module 12 computes at step 94 element u. At step 95, communications module 13 transmits element u to device 2.

At step 96, pseudorandom number generator 14 generates secret triple (d,r,s). At step 97, computation module 15 computes element v. At step 98, communications module 16 transmits element v to device 1.

Steps 96–98 can be performed prior to, simultaneously with, or after steps 93–95.

Computation module 12, at step 99, then determines the value of cryptographic key $K_A = (T^*)^c(A^m v B^n)$. Similarly, computation module 15, at step 100, determines the value of cryptographic key $K_B = (T^*)^d(A^r u B^s)$. Since $K_A$ equals $K_B$, key agreement is achieved between devices 1 and 2 as desired, and $K_A = K_B$ is used as a symmetric session key.

Figure 10:
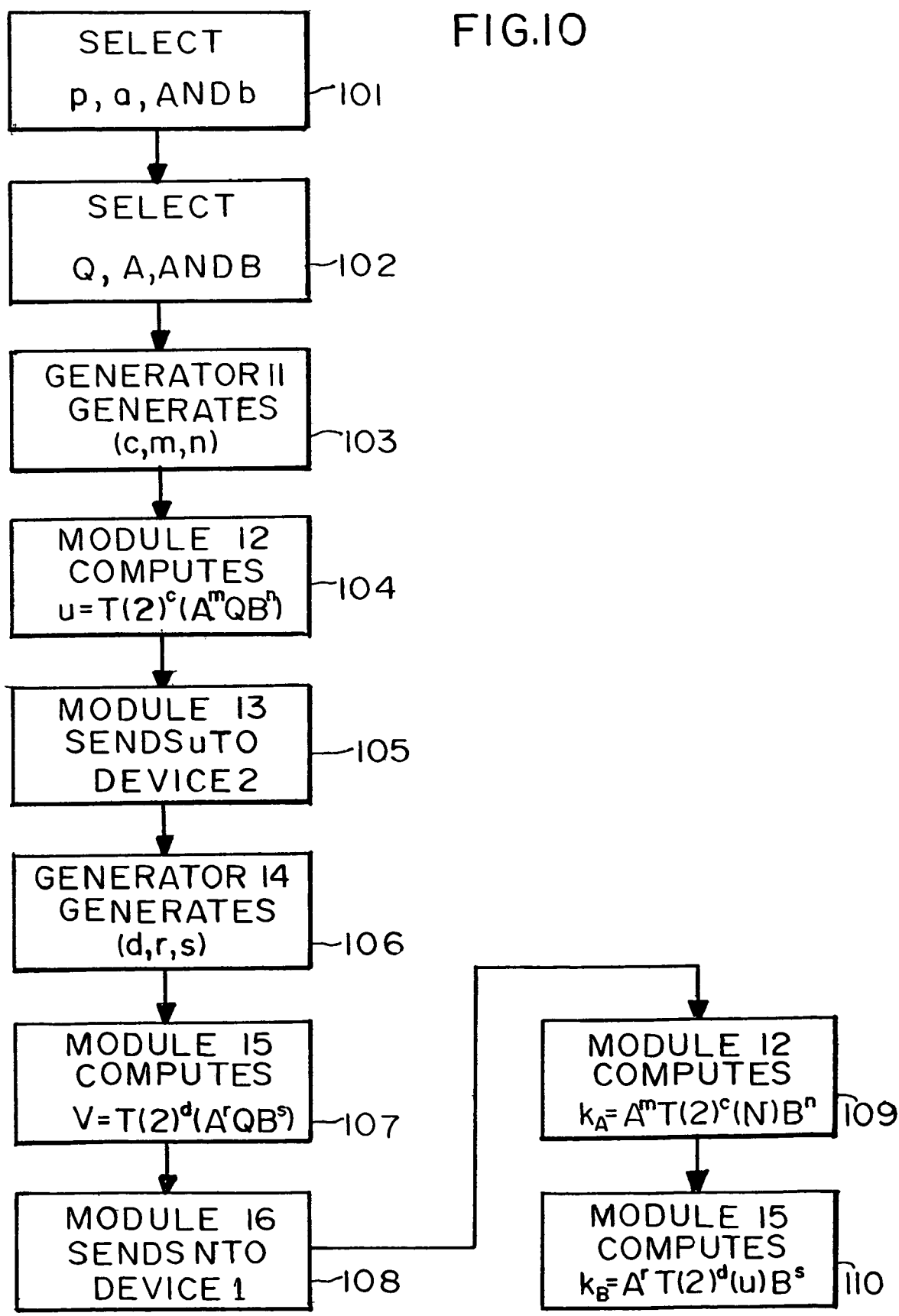
FIG. 10 is a flow diagram of a third embodiment of the second key exchange algorithm, in which matrices over a hyperbolic ring are used.

FIG. 10 is a flow diagram of a third embodiment of the Second Key Exchange Algorithm using matrices over a hyperbolic ring. In this embodiment, our monoid is $Mat_2(R)$. We take h to be the antiautomorphism T(2). We select Q of the form $[a_1+a_2tu, b_1+b_2tu|c_1+c_2tu, d_1+d_2tu]$, where $a_1, a_2, b_1, b_2, c_1, c_2, d_1,$ and $d_2$ are elements of F. We select two matrices A and B such that t doesn't appear in any of the entries of A or B. (This guarantees that $T(2)^2(A) = A$ and $T(2)^2(B) = B$.) We take $Y_1 = Z_1 = \{A^i: i \text{ is an integer}\}$ and $Y_2 = Z_2 = \{B^i: i \text{ is an integer}\}$. In this embodiment, Alice's private key is a triple of integers (c,m,n); Alice's public key is $u = T(2)^c(A^m Q B^n)$. Similarly, Bob's private key is integer triple (d,r,s); and Bob's public key is $v = T(2)^d(A^r Q B^s)$.

We point out that we could take other commuting pairs of matrices, e.g. U and L, in this embodiment.

At step 101, devices 1,2 jointly or severally select p, a, and b. At step 102, devices 1,2 jointly or severally select Q, A, and B. p, a, b, Q, A, and B are transmitted to each device 1,2 if they weren't generated jointly by devices 1,2.

Pseudorandom number generator 11 generates at step 103 secret triple (c,m,n). Then computation module 12 computes at step 104 the element u. At step 105, communications module 13 transmits element u to device 2.

At step 106, pseudorandom number generator 14 generates secret triple (d,r,s). At step 107, computation module 15 computes the element v. At step 108, communications module 16 transmits element v to device 1.

Steps 106–108 can be performed prior to, simultaneously with, or after steps 103–105.

Computation module 12, at step 109, then determines the value of cryptographic key $K_A = A^m T(2)^c(v) B^n$. Similarly, computation module 15, at step 110, determines the value of cryptographic key $K_B = A^r T(2)^d(u) B^s$. Since $K_A$ equals $K_B$, key agreement is achieved between devices 1 and 2 as desired, and $K_A = K_B$ can be used as a symmetric session key.

Figure 11:
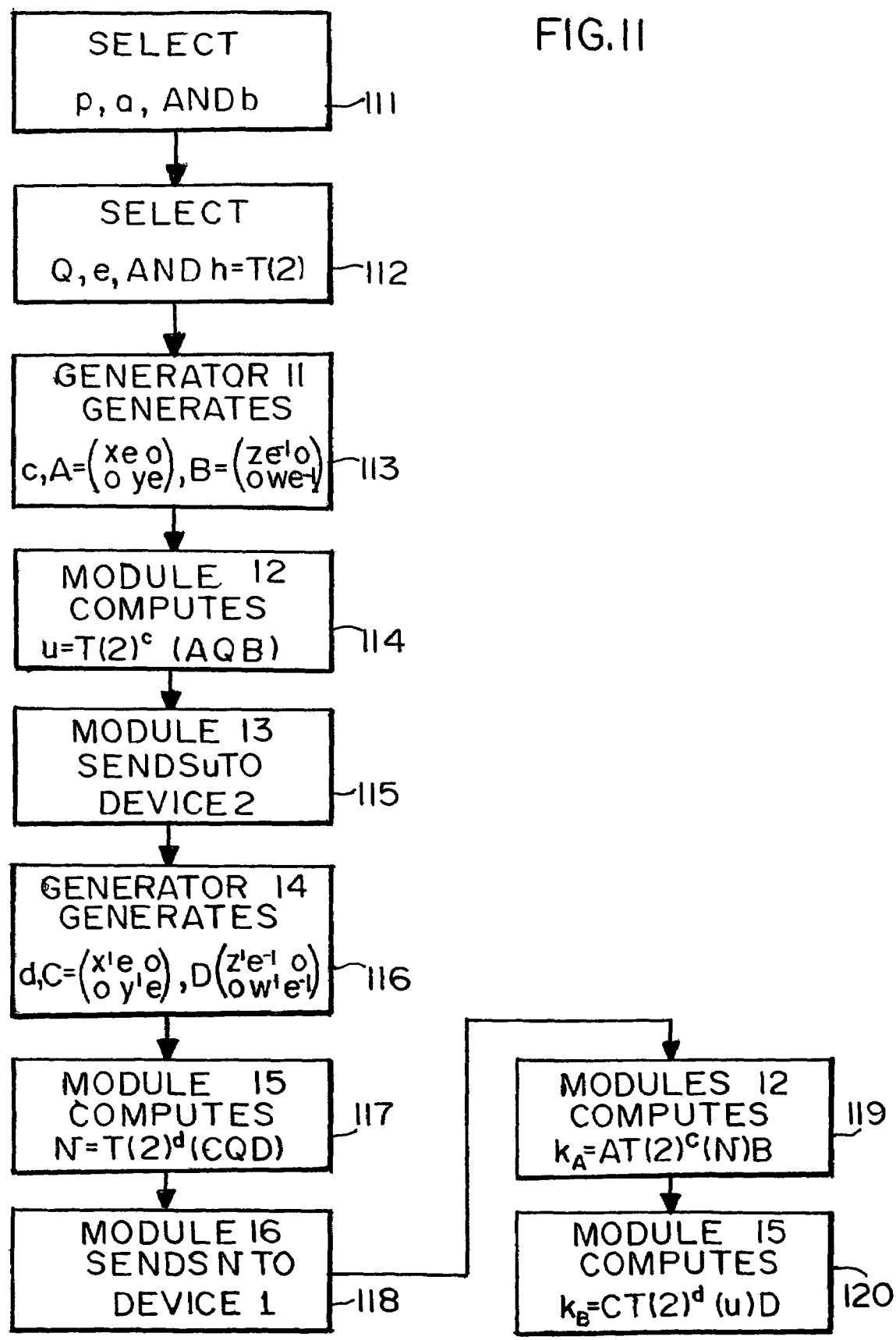
FIG. 11 is a flow diagram of a fourth embodiment of the second key exchange algorithm, in which matrices over a hyperbolic ring are used.

FIG. 11 is a flow diagram of a fourth embodiment of the Second Key Exchange Algorithm using matrices over a hyperbolic ring. In this embodiment, our monoid is $Mat_2(R)$. We take h to be the antiautomorphism T(2). Select an invertible element e in k[u,v] (e.g. u or v), where k is the center of the ring R. For commuting pairs we take $Y_1 = Z_1 = \{[xe, 0|0, ye]: x \text{ and } y \text{ are in } F\}$ and $Y_2 = Z_2 = \{[xe^{-1}, 0|0, ye^{-1}]: x \text{ and } y \text{ are in } F\}$. We select any Q for our base element. In this embodiment, Alice's private key is a triple (c,A,B), where c is an integer, A is in $Y_1$ and B is in $Y_2$; Alice's public key is $u = T(2)^c(AQB)$. Similarly, Bob's private key is a triple (d,C,D), where d is an integer, C is in $Z_1$, and D is in $Z_2$. Bob's public key is $v = T(2)^d(CQD)$.

Since $ee^{-1} = 1$, multiplication by these matrices will not increase the key lengths.

At step 111, devices 1,2 jointly or severally select p, a, and b. At step 112, devices 1,2 jointly or severally select Q, e and h. p, a, b, Q, e, and h are transmitted to each device 1,2 if they weren't generated jointly by devices 1,2.

Pseudorandom number generator 11 generates at step 113 c, A, and B. Then computation module 12 computes at step 114 the element u. At step 115, communications module 13 transmits element u to device 2.

At step 116, pseudorandom number generator 14 generates d, C, and D. At step 117, computation module 15 computes v. At step 118, communications module 16 transmits element v to device 1.

Steps 116–118 can be performed prior to, simultaneously with, or after steps 113–115.

Computation module 12, at step 119, then determines the value of cryptographic key $K_A = AT(2)^c(v)B$. Similarly, computation module 15 (at step 120), determines the value of cryptographic key $K_B = CT(2)^d(u)D$. Since $K_A$ equals $K_B$, key agreement is achieved between devices 1 and 2 as desired, and $K_A = K_B$ can be used as a symmetric session key.

As a simple example of above embodiments, we take:
F={0,1,2,3,4}, the field with 5 elements,
f(x)=x, for all x in F, and f(t)=2t,
uv=3, vu=2, R=F(t)[u,v;f,a],
d=2, e=1, h=1,
$Y_1=Z_1=U=\{[x,*|0,x]: x \text{ is in } F \text{ and } * \text{ is in } R\}$,
$Y_2=Z_2=L=\{[x,0|*,x]: x \text{ is in } F \text{ and } * \text{ is in } R\}$,
$Q=[2tu,3t^{-1}v|v,4u]$.

If Alice's private key is ($y_1=[2,4tu|0,2]$, $y_2=[4,0|2tv,4]$) then her public key $u=y_1Qy_2=[3t+tu+4t^2u+v^2, 4t^{-1}v+4tu^2|t+3v, 2u]$.

As in the example following FIG. 6, we can make the expressions much more complicated using conjugates. We may also use endomorphisms or antiendomoprhisms, e.g. T(2), with these examples.

Figure 12:
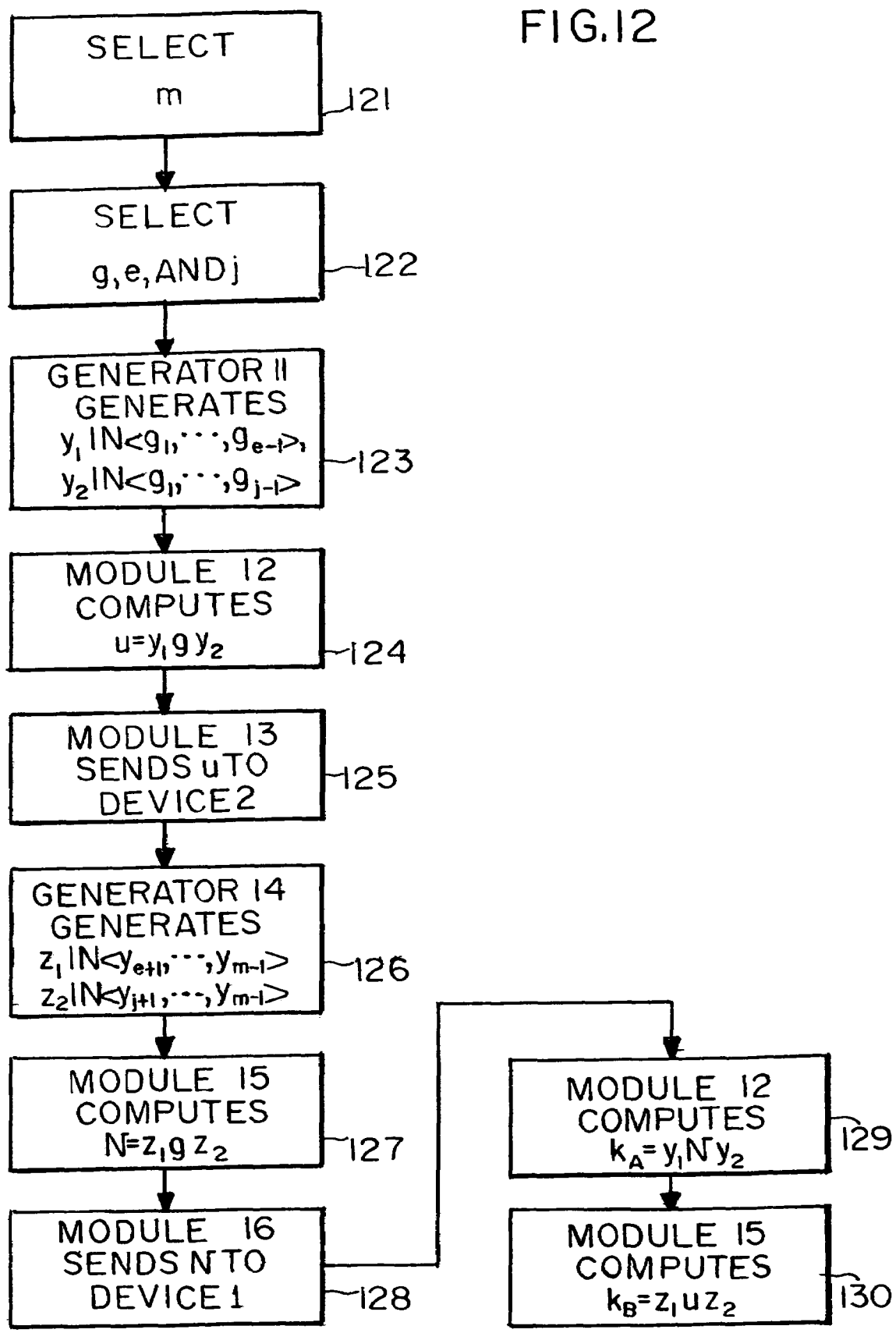
FIG. 12 is a flow diagram of a fifth embodiment of the second key exchange algorithm, in which a braid group is used.

FIG. 12 is a flow diagram of a fifth embodiment of the Second Key Exchange algorithm using a braid group. In this embodiment, a positive integer m and an element g of the braid group $B_m$ are selected. (We chose h=identity for the sake of simplicity, but this embodiment works with an (anti)endomorphism.) Two integers e and j between 2 and m−2 are selected, and the commuting pairs ($Y_1,Z_1$) and ($Y_2,Z_2$) are selected as $Y_1=\langle g_1,\ldots,g_{e-1}\rangle$, $Z_1=\langle g_{e+1},\ldots,g_{m-1}\rangle$, $Y_2=\langle g_1,\ldots,g_{j-1}\rangle$, and $Z_2=\langle g_{j+1},\ldots,g_{m-1}\rangle$. Alice's private key is a pair of elements ($y_1,y_2$), where $y_1$ is in $Y_1$ and $y_2$ is in $Y_2$. Alice's public key is $u=y_1gy_2$. Bob's private key is element pair ($z_1,z_2$), where $z_1$ is in $Z_1$ and $z_2$ is in $Z_2$. Bob's public key is $v=z_1gz_2$.

We may replace either (or both) of ($Y_1,Z_1$) and ($Y_2,Z_2$) by other commuting pair(s), e.g. $Y_1=Z_1=\{b^i: i \text{ is an integer}\}$, where b is an element in $B_m$.

At step 121, devices 1,2 jointly or severally select m. At step 122, devices 1,2 jointly or severally select g, e, and j. m, g, e, and j are transmitted to each device 1,2 if they weren't generated jointly by devices 1,2.

Pseudorandom number generator 11 generates at step 123 $Y_1$ and $Y_2$. Then, computation module 12 computes at step 124 the element u. At step 125, communications module 13 transmits element u to device 2.

At step 126, pseudorandom number generator 14 generates $Z_1$ and $Z_2$. At step 127, computation module 15 computes the element v. At step 128, communications module 16 transmits element v to device 1.

Steps 126–128 can be performed prior to, simultaneously with, or after steps 123–125.

Computation module 12, at step 129, then determines the value of cryptographic key $K_A=y_1vy_2$. Similarly, computation module 15, at step 130, determines the value of cryptographic key $K_B=z_1uz_2$. Since $K_A$ equals $K_B$, key agreement is achieved between devices 1 and 2 as desired, and $K_A=K_B$ can be used as a symmetric session key.

As a simple example, we take
m=7, e=3, j=4 (hence $Y_1=\langle g_1,g_2\rangle$, $Z_1=\langle g_4,g_5,g_6\rangle$, $Y_2=\langle g_1,g_2,g_3\rangle$, $Z_2=\langle g_5,g_6\rangle$)
$g=g_2g_3g_4g_5$.

If Alice's private key is ($g_1^2g_2^{-1}g_1g_2$, $g_2^{-1}g_1g_3g_1^2$), then her public key is $u=(g_1^2g_2^{-1}g_1g_2)(g_2g_3g_4g_5)(g_2^{-1}g_1g_3g_1^2)$. (There is a computer program that puts elements in a braid group in standard form.)

The methods described above can be embodied as computer programs residing on computer readable media such as hard disks, floppy disks, optical disks, magnetic memory, DNA strands, electrons, etc. In such a case, device 1 is typically a first computer readable medium and device 2 is typically a second computer readable medium containing such computer programs.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention. For example, the general method of the present invention can be extended to any field, including the fields of rational, real, or complex numbers. Furthermore, in view of this disclosure, those skilled in the art will appreciate that other types of fields could be adapted to establish key agreement while keeping the secret elements private.

What is claimed is:

1. A method by which a first device and a second device compute a cryptographic key that is used to encrypt and decrypt messages exchanged between the first device and the second device, said method comprising the steps of:

the first device generates a private key q comprising at least one secret integer;

the first device computes a public key u as a function of g, h, and q, where g is an element of a monoid (G,*), (Y,Z) is a commuting pair of subsets of G, and h is an endomorphism or an antiendomorphism on G;

the first device sends u to the second device;

the second device generates a private key w comprising at least one secret integer;

the second device computes a public key v as a function of g, h, and w;

the second device sends v to the first device;

the first device computes $K_A$ as a function of v and q; and the second device computes $K_B$ as a function of u and w, whereby $K_A=K_B$ as a result of a commuting property associated with the commuting pair, and $K_A=K_B$ is used as a cryptographic key to encrypt and decrypt messages exchanged between the first device and the second device, wherein:

q is a secret triple (c, y, n) comprising integers c and n, and an element y in Y;

w is a secret triple (d, z, s) comprising integers d and s, and an element z in Z;

$u=h^c(y*g^n*y^{-1})$;

$v=h^d(z*g^s*z^{-1})$;

$K_A=y*h^c(v^n)*y^{-1}$; and $K_B=z*h^d(u^s)*z^{-1}$.

2. The method of claim 1 wherein $h^2(x)=x$ for all x in Y or Z;

c is a positive odd integer; and d is a positive odd integer.

3. The method of claim 1 wherein h is an endomorphism such that h(x)=x for all x in Y or Z; and c and d are any integers.

4. The method of claim 1, wherein each generating step is performed by a pseudorandom number generator, each computing step is performed by a computation module, and each sending step is performed by a communications module.

5. A method by which a first device and a second device compute a cryptographic key that is used to encrypt and decrypt messages exchanged between the first device and the second device, said method comprising the steps of:

the first device generates a private key q comprising at least one secret element;

the first device computes a public key u as a function of g, h, and q, where g is an element of a monoid (G,*), ($Y_1,Z_1$) and ($Y_2,Z_2$) are two commuting pairs of subsets of G, $Z_1$ is a subset of G, $Z_2$ is a subset of G, and h is an endomorphism or an antiendomorphism on G;

the first device sends u to the second device;

the second device generates a private key w comprising at least one secret element;

the second device computes a public key v as a function of g, h, and w;

the second device sends v to the first device;

the first device computes $K_A$ as a function of v and q; and the second device computes $K_B$ as a function of u and w, whereby $K_A=K_B$ as a result of commuting properties associated with the two commuting pairs, and $K_A=K_B$ is used as a cryptographic key to encrypt and decrypt messages exchanged between the first device and the second device, wherein:

q is a secret triple (c, $y_1$, $y_2$) comprising integer c, element $y_1$ in $Y_1$, and element $y_2$ in $Y_2$;

w is a secret triple (d, $z_1$, $z_2$) comprising integer d, element $z_1$ in $Z_1$, and element $z_2$ in $Z_2$;

$u=h^c(y_1*g*y_2)$ $v=h^d(z_1*g*z_2)$ $K_A=y_1*h^c(v)*y_2$; and $K_B=z_1*h^d(u)*z_2$.

6. The method of claim 5, wherein $h^2(x)=x$ for all x in $Y_1$, $Y_2$, $Z_1$, or $Z_2$;

c is a positive odd integer; and d is a positive odd integer.

7. The method of claim 5, wherein h is an endomorphism such that h(x)=x for all x in $Y_1$, $Y_2$, $Z_1$, or $Z_2$; and c and d are any integers.

8. The method of claim 5, wherein each of the generating steps is performed by a pseudorandom number generator, each of the computing steps is performed by a computation module, and each of the sending steps is performed by a communications module.

9. A method of public key cryptography, using a monoid (G,*), an element g in G, a commuting pair (Y,Z) of subsets of G, and an endomorphism or an antiendomorphism h on G, by which a first device and a second device exchange encrypted messages, said method comprising the steps of:

the first device generates a private key (c, y, n) comprising integers c and n, and an element y in Y;

the first device computes a public key $u=h^c(y*g^n*y^{-1})$ and publishes the public key u;

the second device generates a private key (d, z, s) comprising integers d and s, and an element z in Z;

the second device computes the elements $v=h^d(z*g^s*z^{-1})$ and $K_B=z*h^d(u^s)*z^{-1}$;

the second device sends to the first device the pair of elements (v, $K_B$M) where M is a message in G; and the first device computes $K_A=y*h^c(v^n)*y^{-1}$ and recovers the message $M=K_A^{-1}(K_BM)$.

10. A method of public key cryptography, using a monoid (G,*), an element g in G, two commuting pairs $(Y_1,Z_1)$ and $(Y_2,Z_2)$ of subsets of G, and an endomorphism or an antiendomorphism h on G, by which a first device and a second device exchange encrypted messages, said method comprising the steps of:

the first device generates a private key (c, $y_1$, $y_2$) comprising integer c, an element $y_1$ in $Y_1$, and an element $y_2$ in $Y_2$;

the first device computes a public key $u=h^c(y_1*g*y_2)$, and publishes u;

the second device generates a private key (d,$z_1$,$z_2$) comprising integer d, an element $z_1$ in $Z_1$, and an element $z_2$ in $Z_2$;

the second device computes $v=h^d(z_1*g*z_2)$ and $K_B=z_1*h^d(U)*z_2$;

the second device sends to the first device the pair of elements (v, $K_B$M), where M is a message in G; and the first device computes $K_A=y_1*h^c(v)*y_2$ and recovers $M=K_A^{-1}(K_BM)$.

11. The method of claim 1, further comprising the steps of:

a public hash function H assigns a hash value to each element of the monoid G;

the second device sends to the first device an encrypted message of the form j=M+'H($K_B$), where M is a bit string plaintext and +' denotes an XOR of bit strings; and the first device recovers the message M by computing j+'H($K_A$).

12. The method of claim 5, further comprising the steps of:

a public hash function H assigns a hash value to each element of the monoid G;

the second device sends to the first device an encrypted message of the form j=M+'H($K_B$), where M is a bit string plaintext and +' denotes an XOR of bit strings; and the first device recovers the message M by computing j+'H($K_A$).

13. A method by which a first device and a second device compute a cryptographic key that is used to encrypt and decrypt messages exchanged between the first device and the second device, said method comprising the steps of:

the first device generates a private key q comprising at least one secret integer;

the first device computes a public key u as a function of g, h, and q, where g is an element of a monoid (G,*), (Y,Z) is a commuting pair of subsets of G, and h is an endomorphism or an antiendomorphism h on G;

the first device sends u to the second device;

the second device generates a private key w comprising at least one secret integer;

the second device computes a public key v as a function of g, h, and w;

the second device sends v to the first device;

the first device computes $K_A$ as a function of v and q; and the second device computes $K_B$ as a function of u and w, whereby $K_A=K_B$ as a result of a commuting property associated with the commuting pair, and $K_A=K_B$ is used as a cryptographic key to encrypt and decrypt messages exchanged between the first device and the second device, wherein G is a field F;

the element g is an invertible matrix Q;

$h(x)=PT(2)(x)P^{-1}$, wherein P is an invertible matrix selected in such a way that $T(2)^2(P)=P$ where T is a canonical antiautomorphism;

the private key q generated by the first device is integer pair (c, n);

the private key w generated by the second device is integer pair (d, s);

the public key generated by the first device is $u=h^c(Q^n)$;

the public key generated by the second device is $v=h^d(Q^s)$;

$K_A=h^c(v^n)$; and $K_B=h^d(u^s)$.

14. The method of claim 1, wherein:

the first device uses $K_A$ as a key to encrypt plaintext messages that the first device sends to the second device and to decrypt ciphertext messages that the first device receives from the second device; and the second device uses $K_B$ as a key to encrypt plaintext messages that the second device sends to the first device and to decrypt ciphertext messages that the second device receives from the first device.

15. The method of claim 5, wherein:

the first device uses $K_A$ as a key to encrypt plaintext messages that the first device sends to the second device and to decrypt ciphertext messages that the first device receives from the second device; and the second device uses $K_B$ as a key to encrypt plaintext messages that the second device sends to the first device and to decrypt ciphertext messages that the second device receives from the first device.

16. A method by which a first device and a second device compute a cryptographic key that is used to encrypt and decrypt messages exchanged between the first device and the second device, said method comprising the steps of:

the first device generates a private key q comprising at least one secret integer;

the first device computes a public key u as a function of g, h, and q, where g is an element of a monoid (G,*), (Y,Z) is a commuting pair of subsets of G, and h is an endomorphism or an antiendomorphism h on G;

the first device sends u to the second device;

the second device generates a private key w comprising at least one secret integer;

the second device computes a public key v as a function of g, h, and w;

the second device sends v to the first device;

the first device computes $K_A$ as a function of v and q; and the second device computes $K_B$ as a function of u and w, whereby $K_A=K_B$ as a result of a commuting property associated with the commuting pair, and $K_A=K_B$ is used as a cryptographic key to encrypt and decrypt messages exchanged between the first device and the second device, wherein:

h=T(2) where T is a canonical antiautomorphism;

Y=Z=the set of $P^i$ where i is an integer and P is an invertible matrix;

the element g is a matrix Q;

the private key q generated by the first device is integer triple (c, m, n);

the private key w generated by the second device is integer triple (d, r, s);

the public key generated by the first device is $u=T(2)^c P^m Q^n P^{-m}$;

the public key generated by the second device is $v=T(2)^d P^r Q^s P^{-r}$;

$K_A = P^m T(2)^c (v^n) P^{-m}$; and $K_B = P^r T(2)^d (u^s) P^{-r}$.

17. The method of claim 16 wherein the element g is a matrix $MQM^{-1}$ where M is an invertible matrix.

18. A method by which a first device and a second device compute a cryptographic key that is used to encrypt and decrypt messages exchanged between the first device and the second device, said method comprising the steps of:

the first device generates a private key q comprising at least one secret element;

the first device computes a public key u as a function of g, h, and q, where g is an element of a monoid (G,*), $(Y_1,Z_1)$ and $(Y_2,Z_2)$ are two commuting pairs of subsets of G, $Z_1$ is a subset of G, $Z_2$ is a subset of G, and h is an endomorphism or an antiendomorphism h on G;

the first device sends u to the second device;

the second device generates a private key w comprising at least one secret element;

the second device computes a public key v as a function of g, h, and w;

the second device sends v to the first device;

the first device computes $K_A$ as a function of v and q; and the second device computes $K_B$ as a function of u and w, whereby $K_A=K_B$ as a result of commuting properties associated with the two commuting pairs, and $K_A=K_B$ is used as a cryptographic key to encrypt and decrypt messages exchanged between the first device and the second device, wherein the monoid is a ring of matrices;

h is the identity function;

$Y_1=Z_1=MUM^{-1}$ and $Y_2=Z_2=NLN^{-1}$, where U and L are commuting matrices, and M and N are invertible matrices;

the private key q generated by the first device is matrix pair (C,D);

the private key w generated by the second device is matrix pair (A,B);

the public key generated by the first device is $u=(MCM^{-1})Q(NDN^{-1})$;

the public key generated by the second device is $v=(MAM^{-1})Q(NBN^{-1})$;

$K_A=(MCM^{-1})v(NDN^{-1})$; and $K_B=(MAM^{-1})u(NBN^{-1})$.

19. A method by which a first device and a second device compute a cryptographic key that is used to encrypt and decrypt messages exchanged between the first device and the second device, said method comprising the steps of:

the first device generates a private key q comprising at least one secret element;

the first device computes a public key u as a function of g, h, and q, where g is an element of a monoid (G,*), $(Y_1,Z_1)$ and $(Y_2,Z_2)$ are two commuting pairs of subsets of G, $Z_1$ is a subset of G, $Z_2$ is a subset of G, and h is an endomorphism or an antiendomorphism h on G;

the first device sends u to the second device;

the second device generates a private key w comprising at least one secret element;

the second device computes a public key v as a function of g, h, and w;

the second device sends v to the first device;

the first device computes $K_A$ as a function of v and q; and the second device computes $K_B$ as a function of u and w, whereby $K_A=K_B$ as a result of commuting properties associated with the two commuting pairs, and $K_A=K_B$ is used as a cryptographic key to encrypt and decrypt messages exchanged between the first device and the second device, wherein the monoid is a set of matrices over a hyperbolic ring;

$Y_1=Z_1=$the set of matrices $A^i$ where i is an integer;

$Y_2=Z_2=$the set of matrices $B^i$ where i is an integer;

$h=T^*$ is an endomorphism defined by $T^*(x)=(x^{-1})^t$;

the private key q generated by the first device is integer triple (c, m, n);

the private key w generated by the second device is integer triple (d, r, s);

the public key generated by the first device is $u=(T^*)^c(A^m Q B^n)$;

the public key generated by the second device is $v=(T^*)^d(A^r Q B^s)$;

$K_A=(T^*)^c(A^m v B^n)$; and $K_B=(T^*)^d(A^r u B^s)$.

20. A method by which a first device and a second device compute a cryptographic key that is used to encrypt and decrypt messages exchanged between the first device and the second device, said method comprising the steps of:

the first device generates a private key q comprising at least one secret element;

the first device computes a public key u as a function of g, h, and q, where g is an element of a monoid $(G,*)$, $(Y_1,Z_1)$ and $(Y_2,Z_2)$ are two commuting pairs of subsets of G, $Z_1$ is a subset of G, $Z_2$ is a subset of G, and h is an endomorphism or an antiendomorphism h on G;

the first device sends u to the second device;

the second device generates a private key w comprising at least one secret element;

the second device computes a public key v as a function of g, h, and w;

the second device sends v to the first device;

the first device computes $K_A$ as a function of v and q; and the second device computes $K_B$ as a function of u and w, whereby $K_A=K_B$ as a result of commuting properties associated with the two commuting pairs, and $K_A=K_B$ is used as a cryptographic key to encrypt and decrypt messages exchanged between the first device and the second device, wherein:

the monoid is a set of matrices over a hyperbolic ring;

h is an antiautomorphism T(2);

the private key q generated by the first device is integer triple (c, m, n);

the private key w generated by the second device is integer triple (d, r, s);

the public key generated by the first device is $u=T(2)^c(A^mQB^n)$;

the public key generated by the second device is $v=T(2)^d(A^rQB^s)$;

$K_A=A^mT(2)^c(v)B^n$; and $K_B=A^rT(2)^d(u)B^s$.

21. A method by which a first device and a second device compute a cryptographic key that is used to encrypt and decrypt messages exchanged between the first device and the second device, said method comprising the steps of:

the first device generates a private key q comprising at least one secret element;

the first device computes a public key u as a function of g, h, and q, where g is an element of a monoid $(G,*)$, $(Y_1,Z_2)$ and $(Y_2,Z_2)$ are two commuting pairs of subsets of G, and h is an endomorphism or an antiendomorphism h on G;

the first device sends u to the second device;

the second device generates a private key w comprising at least one secret element;

the second device computes a public key v as a function of g, h, and w;

the second device sends v to the first device;

the first device computes $K_A$ as a function of v and q; and the second device computes $K_B$ as a function of u and w, whereby $K_A=K_B$ as a result of commuting properties associated with the two commuting pairs, and $K_A=K_B$ is used as a cryptographic key to encrypt and decrypt messages exchanged between the first device and the second device, wherein:

the monoid is a set of matrices over a hyperbolic ring;

h is an antiautophorphism T(2);

the private key q generated by the first device is triple (c, A, B), where c is an integer, A is in $Y_1$, and B is in $Y_2$;

the private key w generated by the second device is triple (d, C, D), where d is an integer, C is in $Z_2$, and D is in $Z_2$;

the public key generated by the first device is $u=T(2)^c(AQB)$;

the public key generated by the second device is $v=T(2)^d(CQD)$;

$K_A=AT(2)^c(v)B$; and $K_B=CT(2)^d(u)D$.

22. A method by which a first device and a second device compute a cryptographic key that is used to encrypt and decrypt messages exchanged between the first device and the second device, said method comprising the steps of:

the first device generates a private key q comprising at least one secret element;

the first device computes a public key u as a function of g, h, and q, where g is an element of a monoid $(G,*)$, $(Y_1,Z_1)$ and $(Y_2,Z_2)$ are two commuting pairs of subsets of G, $Z_1$ is a subset of G, $Z_2$ is a subset of G, and h is an endomorphism or an antiendomorphism h on G;

the first device sends u to the second device;

the second device generates a private key w comprising at least one secret element;

the second device computes a public key v as a function of g, h, and w;

the second device sends v to the first device;

the first device computes $K_A$ as a function of v and q; and the second device computes $K_B$ as a function of u and w, whereby $K_A=K_B$ as a result of commuting properties associated with the two commuting pairs, and $K_A=K_B$ is used as a cryptographic key to encrypt and decrypt messages exchanged between the first device and the second device, wherein:

G is a braid group;

the private key q generated by the first device is element pair $(y_1, y_2)$ where $y_1$ is in $Y_1$ and $y_2$ is in $Y_2$;

the private key w generated by the second device is element pair $(z_1, z_2)$ where $z_1$ is in $Z_1$ and $z_2$ is in $Z_2$;

the public key generated by the first device is $u=y_1gy_2$;

the public key generated by the second device is $v=z_1gz_2$;

$K_A=y_1vy_2$; and $K_B=z_1uz_2$.

23. A method of public key cryptography, comprising the steps of:

operating a second device to compute a cryptographic key $K_B$ using a public key u and a private key w, where $u=h^c(y*g^n*y^{-1})$, g is an element of a monoid $(G,*)$, (Y,Z) is a commuting pair of subsets of G, h is an endomorphism or an antiendomorphism on G, y is an element in Y, and c and n are integers, and where w is a secret triple (d, z, s) comprising integers d and s, and an element z in Z;

operating a first device to compute a cryptographic key $K_A$ as a function of a public key v and a private key q, where q is a secret triple (c, y, n) comprising the integers c and n, and the element y in Y, and where $v=h^d(z*g^s*z^{-1})$, where $K_A=y*h^c(v^n)*y^{-1}$, $K_B=z*h^d(u^s)*z^{-1}$, and $K_A=K_B$ as a result of a commuting property associated with the commuting pair;

operating the first device to use the key $K_A$ to encrypt plaintext messages that the first device sends to the second device and to decrypt ciphertext messages that the first device receives from the second device; and operating the second device to use the key $K_B$ to encrypt plaintext messages that the second device sends to the first device and to decrypt ciphertext messages that the second device receives from the first device.

24. A method of public key cryptography, comprising the steps of:

operating a second device to compute a cryptographic key $K_B$ using a public key u and a private key w, where $u=h^c(y_1*g*y_2)$, g is an element of a monoid $(G,*)$, $(Y_1,Z_1)$ and $(Y_2,Z_2)$ are two commuting pairs of subsets of G, $Z_1$ is a subset of G, $Z_2$ is a subset of G, h is an endomorphism or an antiendomorphism on G, $y_1$ is an element in $Y_1$, $y_2$ is an element in $Y_2$, and c is an integer, and where w is a secret triple $(d, z_1, z_2)$ comprising integer d, element $z_1$ in $Z_1$, and element $z_2$ in $Z_2$;

operating a first device to compute a cryptographic key $K_A$ as a function of a public key v and a private key q, where q is a secret triple $(c, y_1, y_2)$ comprising the integer c, the element $y_1$ in $Y_1$, and the element $y_2$ element in $Y_2$, and where $v=h^d(z_1*g*z_2)$, where $K_A=y_1*h^c(v)*y_2$, $K_B=z_1*h^d(u)*z_2$, and $K_A=K_B$ as a result of a commuting property associated with the two commuting pairs;

operating the first device to use the key $K_A$ to encrypt plaintext messages that the first device sends to the second device and to decrypt ciphertext messages that the first device receives from the second device; and operating the second device to use the key $K_B$ to encrypt plaintext messages that the second device sends to the first device and to decrypt ciphertext messages that the second device receives from the first device.

25. A method of public key cryptography, comprising the steps of:

operating a second device to compute a cryptographic key $K_B$ using a public key u and a private key w, where $u=T(2)^c P^m Q^n P^{-m}$, T is a canonical antiautomorphism, P is an invertible matrix that is a subset of a monoid $(G,*)$, Q is a matrix that is an element of the monoid $(G,*)$, and c, m, and n are integers, and where w is an integer triple $(d, r, s)$ comprising integers d, r, and s;

operating a first device to compute a cryptographic key $K_A$ as a function of a public key v and a private key q, where q is an integer triple $(c, m, n)$ comprising the integers c, m, and n, and where $v=T(2)^d P^r Q^s P^{-r}$, where $K_A=K_B$, $K_A=P^m T(2)^c (v^n) P^{-m}$, and $K_B=P^r(2)^d (u^s) P^{-r}$;

operating the first device to use the key $K_A$ to encrypt plaintext messages that the first device sends to the second device and to decrypt ciphertext messages that the first device receives from the second device; and operating the second device to use the key $K_B$ to encrypt plaintext messages that the second device sends to the first device and to decrypt ciphertext messages that the second device receives from the first device.

26. A method of public key cryptography, comprising the steps of:

operating a second device to compute a cryptographic key $K_B$ using a public key u and a private key w, where $u=y_1 g y_2$, g is an element of a monoid $(G,*)$, G is a braid group, $(Y_1,Z_1)$ and $(Y_2,Z_2)$ are two commuting pairs of subsets of G, $Z_1$ is a subset of G, $Z_2$ is a subset of G, h is an endomorphism or an antiendomorphism on G, $y_1$ is an element in $Y_1$, and $y_2$ is an element in $Y_2$, and where w is an element pair $(z_1, z_2)$ comprising an element $z_1$ in $Z_1$ and an element $z_2$ in $Z_2$;

operating a first device to compute a cryptographic key $K_A$ as a function of a public key v and a private key q, where q is an element pair $(y_1, y_2)$ comprising the element $y_1$ in $Y_1$ and the element $y_2$ element in $Y_2$, and where $v=z_1 g z_2$, where $K_A=y_1 v y_2$, and $K_B=z_1 u z_2$, and $K_A=K_B$ as a result of a commuting property associated with the two commuting pairs;

operating the first device to use the key $K_A$ to encrypt plaintext messages that the first device sends to the second device and to decrypt ciphertext messages that the first device receives from the second device; and operating the second device to use the key $K_B$ to encrypt plaintext messages that the second device sends to the first device and to decrypt ciphertext messages that the second device receives from the first device.

\* \* \* \* \*